(12) United States Patent
Toulotte

(10) Patent No.: US 7,979,319 B2
(45) Date of Patent: Jul. 12, 2011

(54) METHOD AND SYSTEMS FOR FACILITATING A PURCHASE CORRESPONDING TO AN EVENT BY DETERMINING A PURCHASE RECOMMENDATION BASED ON A RECORD OF A GIVEN SCREENSAVER BEING USED

(75) Inventor: Jean-Jacques Toulotte, Ipwich, MA (US)

(73) Assignee: Graphique de France, Ltd., Woburn, MA (US)

( * ) Notice: Subject to any disclaimer, the term of this patent is extended or adjusted under 35 U.S.C. 154(b) by 1427 days.

(21) Appl. No.: 11/384,027

(22) Filed: Mar. 17, 2006

(65) Prior Publication Data

US 2007/0219874 A1    Sep. 20, 2007

(51) Int. Cl.
*G06Q 30/00* (2006.01)
(52) U.S. Cl. .............. 705/26.7; 705/14.5; 705/14.51
(58) Field of Classification Search ............ 705/14.1, 705/14.39, 14.4, 14.49, 14.67, 26, 27
See application file for complete search history.

(56) References Cited

U.S. PATENT DOCUMENTS

| | | | | |
|---|---|---|---|---|
| 5,855,006 | A * | 12/1998 | Huemoeller et al. | 705/9 |
| 6,975,910 | B1 * | 12/2005 | Brown et al. | 700/90 |
| 2002/0026349 | A1 * | 2/2002 | Reilly et al. | 705/14 |
| 2002/0065741 | A1 * | 5/2002 | Baum | 705/26 |
| 2002/0143664 | A1 * | 10/2002 | Webb | 705/27 |

OTHER PUBLICATIONS

Reminder Service Free Birthday Anniversary Calendar Retrieved from Internet: http://www.anyreminder.com/6/18/2006.
Products From New Zealand.com —Free Reminder Service —Unique and Speci . . . d ones with, Maori Art, Jewelry, Exotic Foods, Fashion Clothes and More: http://productsfromnz.com/reminder (1 of 5)Jun. 18, 2006.
http://www.kirkwood-mall.com/Application/reminder/index.cfm?MallID=89 (1 of 2)Jun. 18, 2006 Welcome to Kirkwood Mall Reminder Service.
http://www.sportsgreetingcards.com/forms/reminder_service.htm (1 of 3)Jun. 18, 2006 FREE Reminder Service from Sports Spectrum Greeting Cards.
http://www.bigdates.com/about/default.asp6/18/2006 About US. Personalized reminders for Birthdays, Anniversaries, Mother's Day, Valentine's Day, other Holidays.
http://www.etoys.com/s/BdaySubscriptions.html?lid=S3& ts=A0016/18/2006 eToys: Please provide your e-mail address.
http://disneyshopping.go.com/DSSectionPage.process?MerchantId=133936/18/2006 DisneyShopping.com: Event Reminder-Birthday.
http://www.boutell.com/birthday.cgi (1 of 2)Jun. 18, 2006, World Birthday Web.

* cited by examiner

*Primary Examiner* — Adam Levine
(74) *Attorney, Agent, or Firm* — Sunstein Kann Murphy & Timbers LLP

(57) ABSTRACT

The present invention is directed to facilitating purchases for events, and more particularly, displaying purchase recommendations and links in conjunction with events in a calendar displayed in a computer desktop application. In one aspect, the invention is a method comprising displaying a calendar in a computer desktop application; receiving information from a server corresponding to an event; displaying a reminder in the calendar corresponding to the given event, said reminder comprising information corresponding to said event and at least one link to an online store; and determining a purchase recommendation corresponding to the given event, wherein the purchase recommendation is determined with respect to a record of a given screensaver being used.

31 Claims, 15 Drawing Sheets

1402 — displaying a calendar in a computer desktop background

1402 — transmitting to a server information corresponding to an event entered by a user.

*Fig. 14*

METHOD AND SYSTEMS FOR FACILITATING A PURCHASE CORRESPONDING TO AN EVENT BY DETERMINING A PURCHASE RECOMMENDATION BASED ON A RECORD OF A GIVEN SCREENSAVER BEING USED

FIELD OF THE INVENTION

The present invention is directed to facilitating purchases for events, and more particularly, displaying purchase recommendations and links in conjunction with events in a calendar displayed in a computer desktop application.

BACKGROUND OF THE INVENTION

Many people have difficulty remembering events such as holidays, birthdays, and anniversaries. Calendars currently exist in many formats, including printed calendars and software that displays a calendar on a computer, and these may be used to remind people of current and upcoming events. However, many calendars may not remind a person of an event before the event has already occurred. Many calendars may also remind a person of an event at a time when it is inconvenient for a person to take an appropriate action in preparation for an event. For example, many holidays and events are customarily associated with gift giving. A person may consult a calendar and be reminded of an upcoming birthday, but because the person is not currently near a store or means of purchasing a gift, the reminder may be ineffective.

Thus, there exists a need for a system or method that effectively reminds people of upcoming events and provides efficient means for the people to then purchase items for the upcoming events.

SUMMARY OF THE INVENTION

The present invention provides a system and method for facilitating event purchases. The invention provides a means for people to effectively be reminded of upcoming events, and an efficient means for people to purchase items for the upcoming events.

In one aspect, the invention is a method for facilitating event purchases. The method comprises displaying a calendar in a computer desktop application; identifying information corresponding to a date for an event; determining a purchase recommendation corresponding to the given event; and displaying a reminder in said calendar corresponding to the given event, said reminder comprising: information corresponding to said event, said purchase recommendation and at least one link to an online store.

In another aspect, the invention is a computer-implemented system for facilitating event purchases comprising: a screen which displays a calendar in a computer desktop application, said calendar comprising a reminder corresponding to a given event, said reminder comprising information corresponding to said event and at least one link to an online store; a processor in communication with the screen which identifies information corresponding to a date for an event and generates said reminders; and a storage element in communication with said processor and said screen which stores information relating to said calendar.

In yet another aspect, the invention is an article of manufacture intended for sale as a unitary item comprising a printed calendar having a plurality of images, and computer readable program means for displaying a calendar in a computer desktop application. In some embodiments, the article of manufacture also comprises computer readable program code for displaying a screensaver, the displayed screensaver comprising a series of images substantially similar to the plurality of images in the printed calendar.

BRIEF DESCRIPTION OF THE DRAWINGS

The foregoing and other objects, aspects, features, and advantages of the invention will become more apparent and may be better understood by referring to the following description taken in conjunction with the accompanying drawings, in which:

FIG. 14 is a flow diagram of another embodiment of a method for facilitating event purchases.

DETAILED DESCRIPTION OF THE INVENTION

Figure 1A:
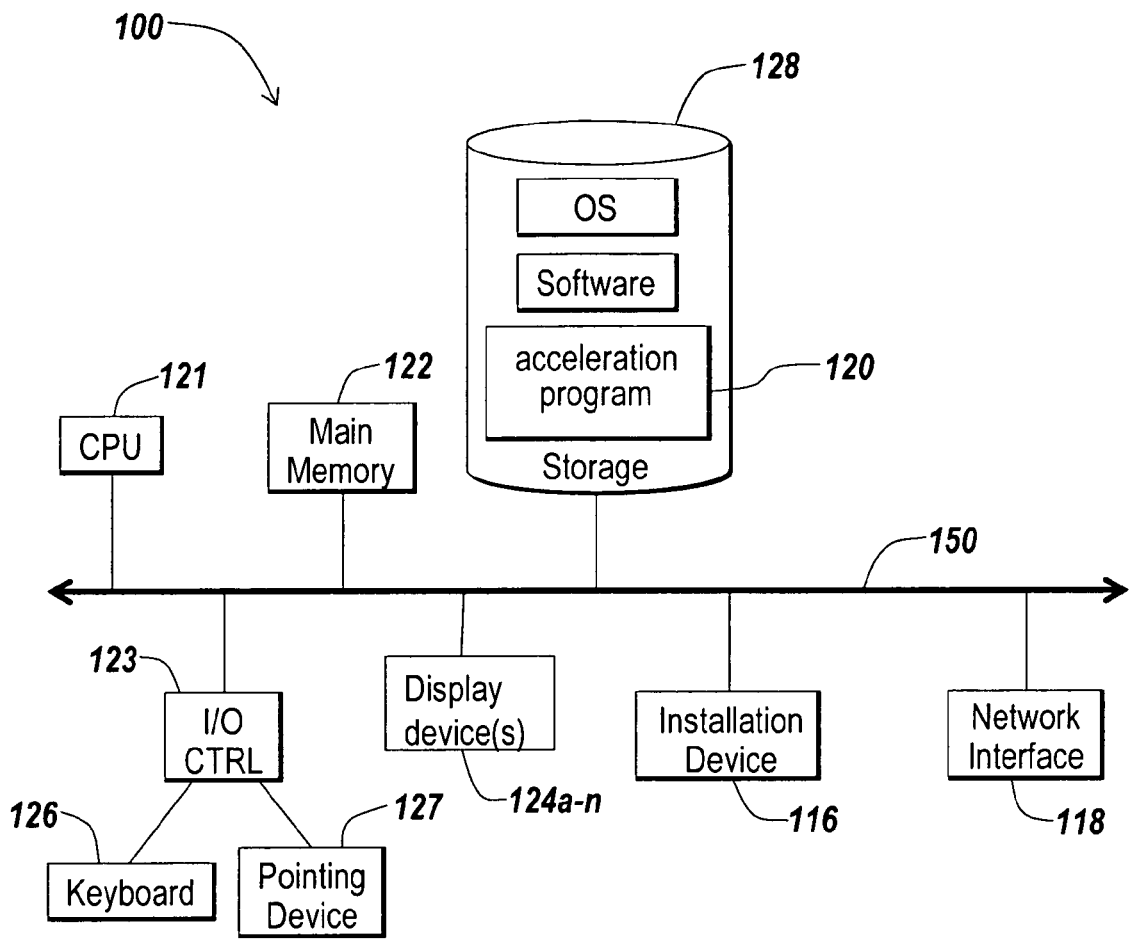
FIGS. 1A and 1B are block diagrams of embodiments of a computing or network device useful as a device in a client-server network.
Figure 1B:
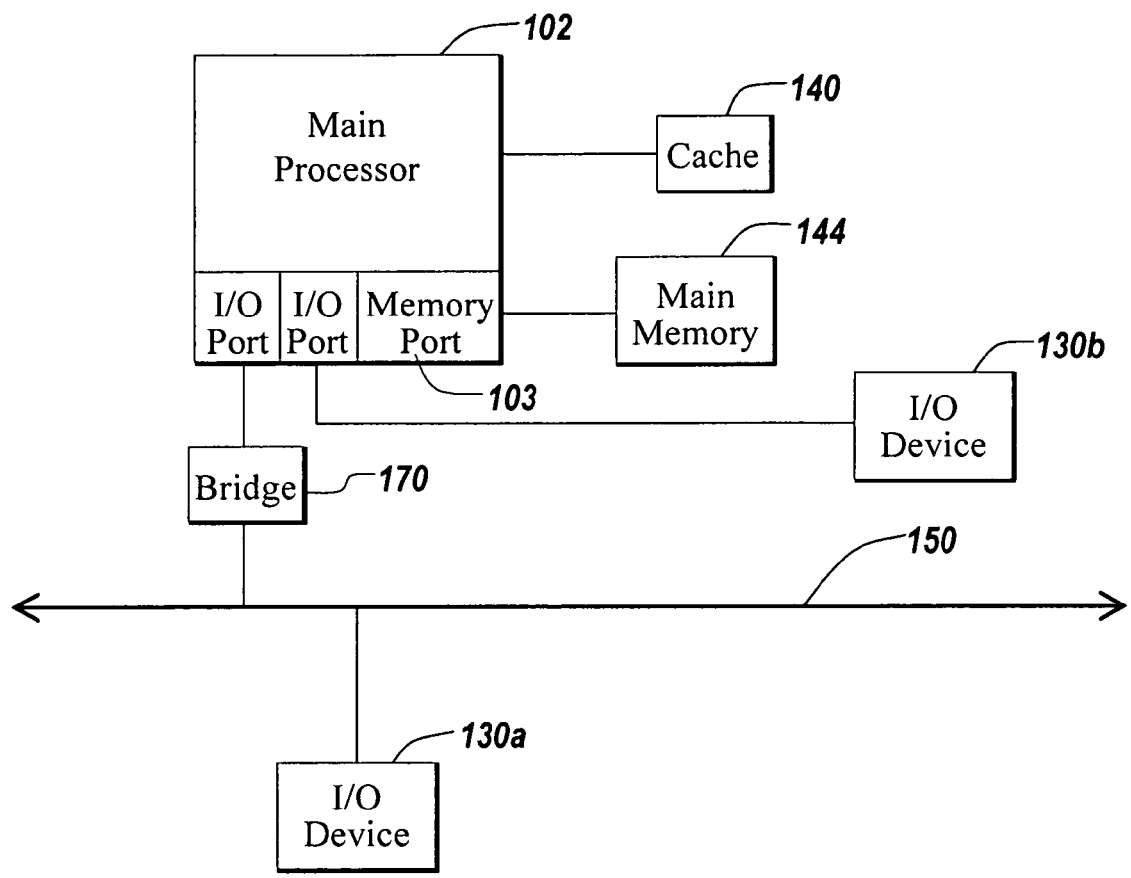

FIGS. 1A and 1B depict block diagrams of a typical computer 100 useful as client computing devices and server computing devices. As shown in FIGS. 1A and 1B, each computer 100 includes a central processing unit 102, and a main memory unit 104. Each computer 100 may also include other optional elements, such as one or more input/output devices 130a-130-b (generally referred to using reference numeral 130), and a cache memory 140 in communication with the central processing unit 102.

The central processing unit 102 is any logic circuitry that responds to and processes instructions fetched from the main memory unit 104. In many embodiments, the central processing unit is provided by a microprocessor unit, such as those manufactured by Intel Corporation of Mountain View, Calif.; those manufactured by Motorola Corporation of Schaumburg, Ill.; the Crusoe and Efficeon lines of processors manufactured by Transmeta Corporation of Santa Clara, Calif.; the lines of processors manufactured by International Business Machines of White Plains, N.Y.; or the lines of processors manufactured by Advanced Micro Devices of Sunnyvale, Calif.

Main memory unit 104 may be one or more memory chips capable of storing data and allowing any storage location to be directly accessed by the microprocessor 102, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). In the embodiment shown in FIG. 1A, the processor 102 communicates with main memory 104 via a system bus 120 (described in more detail below). FIG. 1B depicts an embodiment of a computer system 100 in which the processor communicates directly with main memory 104 via a memory port. For example, in FIG. 1B the main memory 104 may be DRDRAM.

FIGS. 1A and 1B depict embodiments in which the main processor 102 communicates directly with cache memory 140 via a secondary bus, sometimes referred to as a "backside" bus. In other embodiments, the main processor 102 communicates with cache memory 140 using the system bus 120. Cache memory 140 typically has a faster response time than main memory 104 and is typically provided by SRAM, BSRAM, or EDRAM.

In the embodiment shown in FIG. 1A, the processor 102 communicates with various I/O devices 130 via a local system bus 120. Various busses may be used to connect the central processing unit 102 to the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is an video display, the processor 102 may use an Advanced Graphics Port (AGP) to communicate with the display. FIG. 1B depicts an embodiment of a computer system 100 in which the main processor 102 communicates directly with I/O device 130b via HyperTransport, Rapid I/O, or InfiniBand. FIG. 1B also depicts an embodiment in which local busses and direct communication are mixed: the processor 102 communicates with I/O device 130a using a local interconnect bus while communicating with I/O device 130b directly.

A wide variety of I/O devices 130 may be present in the computer system 100. Input devices include keyboards, mice, trackpads, trackballs, microphones, and drawing tablets. Output devices include video displays, speakers, inkjet printers, laser printers, and dye-sublimation printers. An I/O device may also provide mass storage for the computer system 800 such as a hard disk drive, a floppy disk drive for receiving floppy disks such as 3.5-inch, 5.25-inch disks or ZIP disks, a CD-ROM drive, a CD-R/RW drive, a DVD-ROM drive, tape drives of various formats, and USB storage devices such as the USB Flash Drive line of devices manufactured by Twintech Industry, Inc. of Los Alamitos, Calif.

In further embodiments, an I/O device 130 may be a bridge between the system bus 120 and an external communication bus, such as a USB bus, an Apple Desktop Bus, an RS-132 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

General-purpose computers of the sort depicted in FIG. 1A and FIG. 1B typically operate under the control of operating systems, which control scheduling of tasks and access to system resources. Typical operating systems include: MICROSOFT WINDOWS, manufactured by Microsoft Corp. of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, among others.

For embodiments comprising mobile devices, the device may be a JAVA-enabled cellular telephone, such as the i55sr, i58sr, i85s, or the i88s, all of which are manufactured by Motorola Corp. of Schaumburg, Ill.; the 6035 or the 7135, manufactured by Kyocera of Kyoto, Japan; or the i300 or i330, manufactured by Samsung Electronics Co., Ltd., of Seoul, Korea. In other embodiments comprising mobile devices, a mobile device may be a personal digital assistant (PDA) operating under control of the PalmOS operating system, such as the Tungsten W, the VII, the VIIx, the i705, all of which are manufactured by palmOne, Inc. of Milpitas, Calif. In further embodiments, the client 113 may be a personal digital assistant (PDA) operating under control of the PocketPC operating system, such as the IPAQ 4155, iPAQ 5555, iPAQ 1945, iPAQ 2215, and iPAQ 4255, all of which manufactured by Hewlett-Packard Corporation of Palo Alto, Calif.; the ViewSonic V36, manufactured by ViewSonic of Walnut, Calif.; or the Toshiba PocketPC e405, manufactured by Toshiba America, Inc. of New York, N.Y. In still other embodiments, the mobile device is a combination PDA/telephone device such as the Treo 180, Treo 270, Treo 600, Treo 650, or the Treo 700, all of which are manufactured by palmone, Inc. of Milpitas, Calif. In still further embodiments, the mobile device is a cellular telephone that operates under control of the PocketPC operating system, such as the MPx200, manufactured by Motorola Corp. A typical mobile device may comprise many of the elements described above in FIGS. 1A and 1B, including the processor 102 and the main memory 104.

Figure 2:
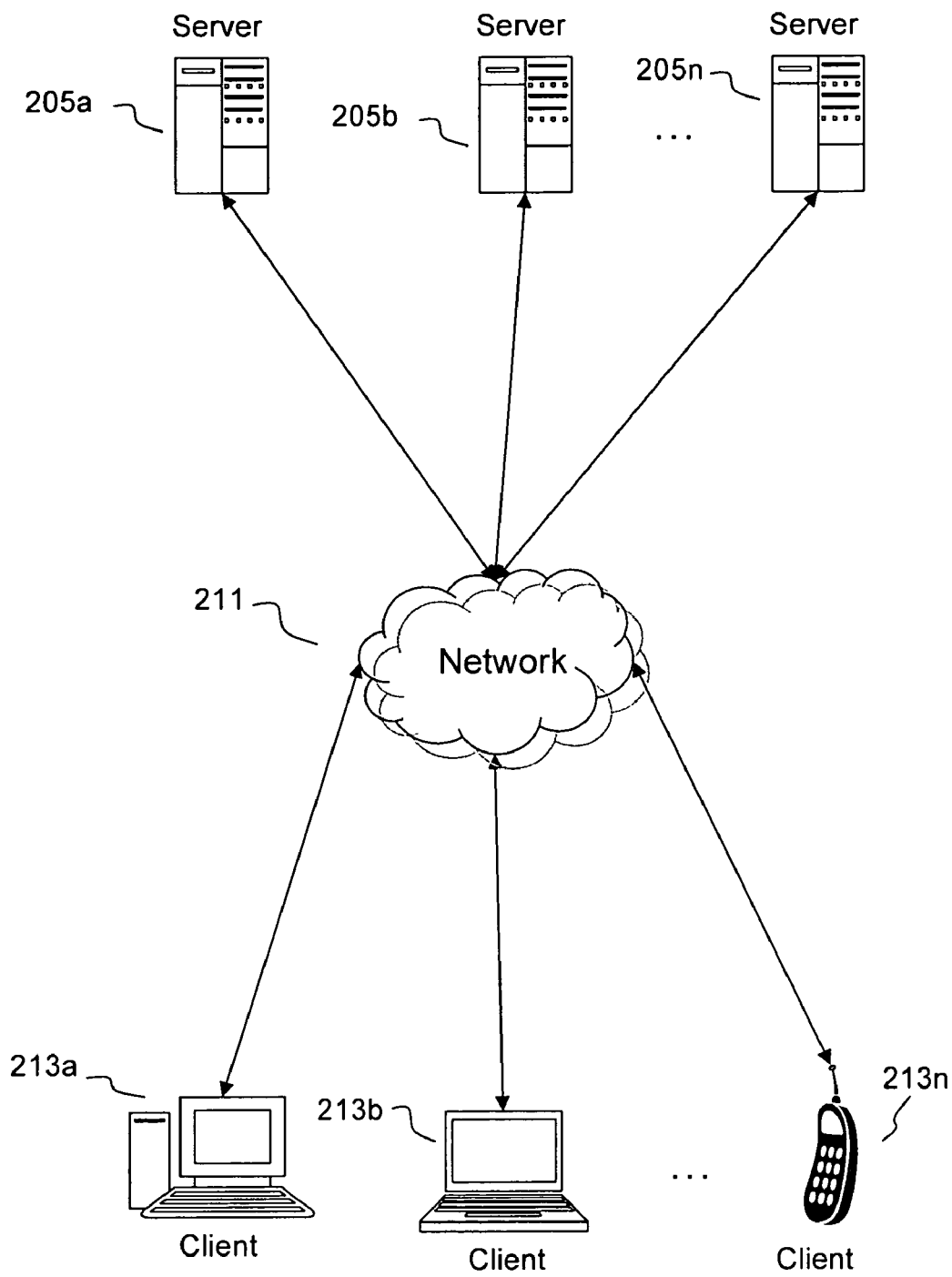
FIG. 2 is a block diagram illustrating an embodiment of a client-server network.

FIG. 2 depicts a block diagram illustrating an embodiment of a client-server network. In brief overview, a number of clients 213a, 213b, . . . 213n' (collectively referred to as 213), are connected via a network 211 to a number of servers 205a, 205b, 205n (collectively referred to as 205). The clients 213, networks 211, and servers 205 may comprise any computing devices comprising substantially similar capabilities, descriptions, functions, and configurations as described above.

Still referring to FIG. 2, in greater detail, a number of servers 205 is shown. In the embodiment shown, the servers 205 may comprise any device capable of processing information and sending and receiving information, including a standalone computer server, a blade server, a rack mounted server, or a group of any types of said servers. The servers may further comprise databases, file servers, web servers, application servers or any other type of server. In embodiments involving multiple servers, the servers may be identical servers, or may differ in make, model, type, content, performance, availability, or any other aspect.

The network 211 may comprise the Internet, local networks, web servers, file servers, routers, databases, computers, servers, network appliances, or any other computing devices capable of sending and receiving information. The networks 211 may comprise computing devices connected via cables, IR ports, wireless signals, or any other means of connecting multiple computing devices. The network 211 and any devices connected to the networks may communicate via any communication protocol used to communicate among or within computing devices, including without limitation SSL, HTML, XML, RDP, ICA, FTP, HTTP, TCP, IP, UDP, IPX, SPX, NetBIOS, NetBEUI, SMB, SMTP, Ethernet, ARCNET, Fiber Distributed Data Interface (FDDI), RS232, IEEE 802.11, IEEE 802.11a, IEE 802.11b, IEEE 802.11g and direct asynchronous connections, or any combination thereof. The networks 211 may comprise mobile telephone networks utilizing any protocol or protocols used to communicate among mobile devices including AMPS, TDMA, CDMA, GSM, GPRS or UMTS.

Figure 3:
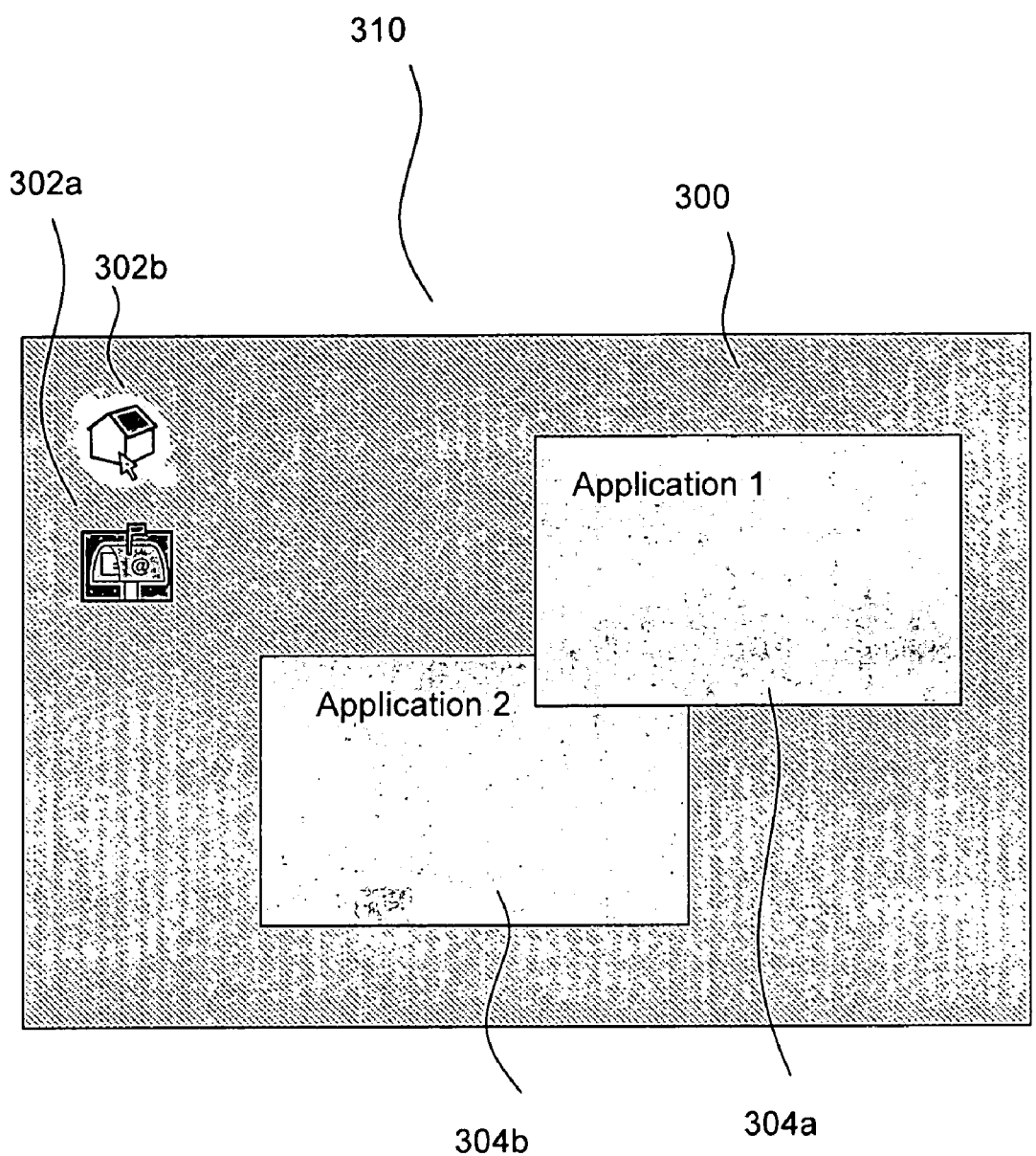
FIG. 3 is a block diagram illustrating an example of a computer desktop.

Referring now to FIG. 3, a block diagram illustrating an example of a computer desktop 310 is shown. In brief overview, the computer desktop 310 comprises a background 300 (indicated by the diagonally hatched region), a number of icons 302a, 302b (generally 1202), and a number of applications 304a, 304b (generally 1204). The computer desktop may comprise anything capable of being displayed on a computer, including an application, icon, utility, menu, document, file, toolbar, status bar, system tray, panel, and dialog. A computer desktop 310 may be displayed on a display of any of the computing devices discussed previously.

Still referring to FIG. 3, now in greater detail, an example of a computer desktop 310 is shown. The desktop 310 comprises a background 300 which is displayed behind any executing applications 304a, 304b and icons 302a, 302b. The background 300 may be obscured either partially or completely by any application, utility, menu, document, file, toolbar, status bar, system tray, panel, or dialog. Although the background 300 may be obscured from view, the background 300 is always present in the desktop 310. When all the items obscuring all or a portion of the desktop background 300 have been closed or moved, the desktop background typically becomes visible again. The desktop background 300 can typically not be closed or minimized without altering the desktop 310 settings. Thus, the desktop background 300 is unlike applications 304 which may typically can be closed or minimized without altering the desktop 310 settings. Well known desktop backgrounds 300 may comprise a blank screen, a geometric pattern, or a favorite image of the user.

In some embodiments, displaying a desktop computer application may comprise displaying an application with a standard desktop application window. In some embodiments, displaying a program in a computer desktop application 300 may comprise displaying a program in an application window, wherein said application window lacks the title bar, window sizing buttons, and window close buttons common to typical application windows. In other embodiments, displaying a computer desktop application may comprise displaying a program in a computer desktop background 300. Displaying a program in a computer desktop background may comprise displaying a program such that all visual output from the program is displayed in the desktop background 300. In this embodiment, the program would always be displayed behind any open applications 304 on the desktop 310.

Figure 4:
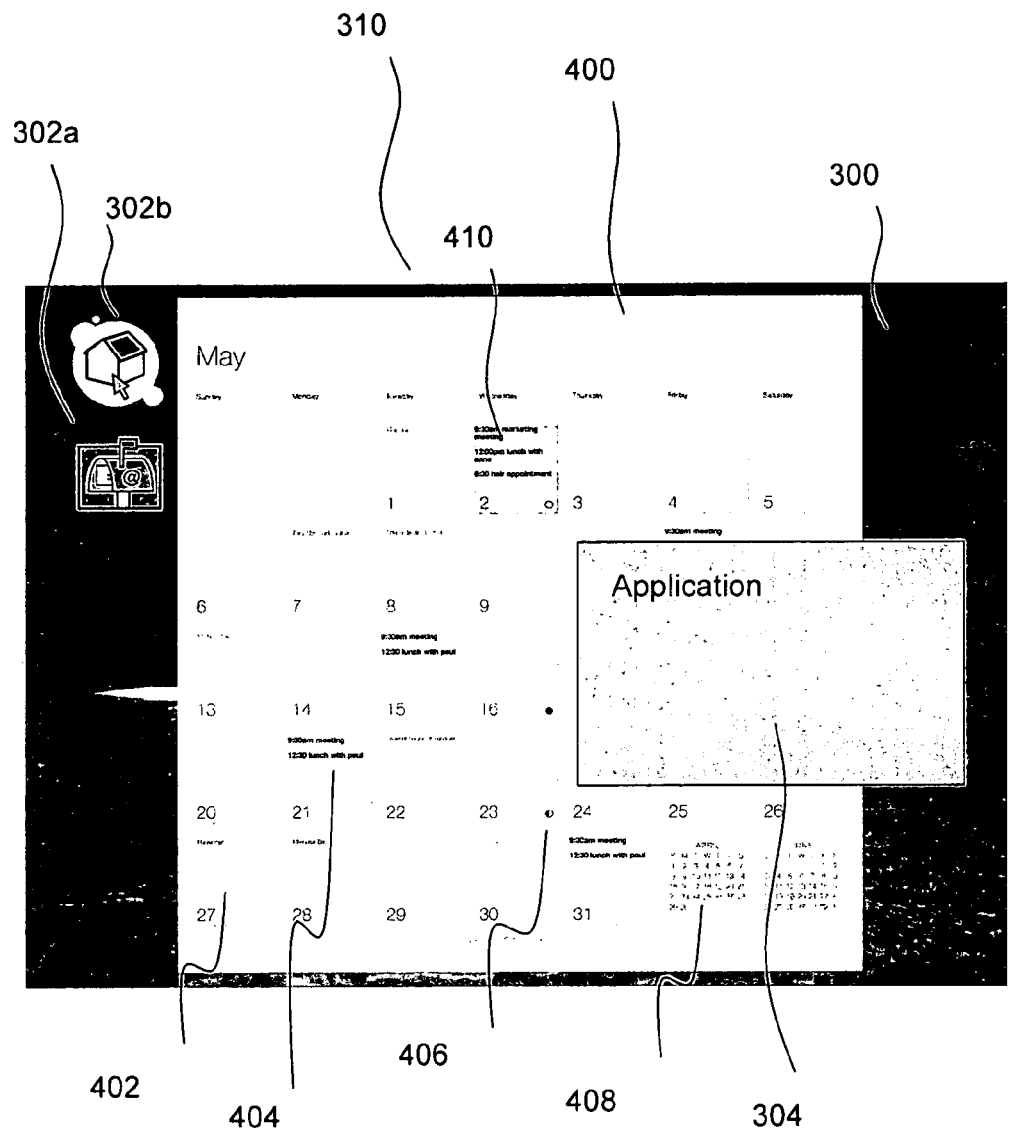
FIG. 4 is an illustration of one embodiment of a calendar displayed in a computer desktop application.

Referring now to FIG. 4, an embodiment of a calendar 400 displayed in a computer desktop application 300 is shown. In brief overview, the computer desktop 310 comprises a number of icons 302a, 302b, an application 304, and a background 300 comprising a calendar 400. The calendar 400 may comprise any event or element typical to a calendar of any other type such as a printed calendar or day-planner. The events, dates, text, symbols and images displayed in the calendar 400 may be manually entered by a user, or may be automatically provided by the calendar 400.

Still referring to FIG. 4, now in greater detail, a calendar 400 is displayed in a computer desktop application 300. In some embodiments, the calendar 400 may cover or occupy a portion of the computer desktop background 300. In other embodiments, the calendar 400 may cover or occupy the entire computer desktop background 300. In some embodiments, the calendar 400 may be displayed along with or superimposed over an image. In one embodiment, the image may be substantially similar to an image from a printed calendar. In another embodiment, the image may correspond to a theme corresponding to a plurality of images from a printed calendar. In still another embodiment, the image may be selected by a user.

A calendar 400 comprises functionality for visually depicting a given time period and visually depicting events scheduled to occur within the time period. Time periods depicted may comprise any time period including standard calendar time periods of years, months, weeks, days, and hours. In some embodiments, a calendar 400 may comprise functionality for viewing a plurality of such time periods. A calendar 400 may comprise means for a user to switch between a plurality of such views. A user may switch between the views of differing time periods using any input means, including selecting the view from using a menu, button, slider, checkbox, toggle, mouse click, or keyboard. In one embodiment, clicking on a square corresponding to a date in a month view might bring up the detailed view of that particular day. In another embodiment, a menu might be provided which allows the user to select a day, week, month, or year view.

Events may comprise any activity, task, or occurrence associated with a given time. Examples of events include birthdays, anniversaries, holidays, ceremonies, meetings, appointments, tasks, chores, and trips. Other examples of events may include reminders corresponding to given events. For example, a calendar 400 may store both a given family member's birthday as well as a reminder one week before the person's birthday to purchase a gift.

A date corresponding to an event may comprise any time specification, including year, month, week, day, and specific time. For example, the date of a persons birthday may comprise a specific year and day, while the date of a lunch meeting may comprise a week, day, and specific time.

A Calendar 400 may display a date or number of dates, and events corresponding to those dates. A calendar 400 may display text, symbols, or images corresponding to any event, date, and occasion typically found in printed or electronic calendars, including without limitation, birthdays, holidays, anniversaries, celebrations, ceremonies, meetings, appointments. In the embodiment shown in FIG. 4, the calendar 400 displays boxes (e.g. 402) for every date in a given month. The boxes may comprise indicators of events, including text, symbols, or images. For example, in the embodiment shown, the calendar 400 displays bold text 404 to list the events scheduled for a given day. The calendar 400 displays holidays in regular text 402, and also displays icons indicating the moon phase for given dates 406. The calendar 400 also comprises a snapshot of the surrounding months 408.

A calendar 400 may display some or all of the events for a given date. In some embodiments, the calendar 400 may determine how much information to display depending on the size of the space allocated for a given date 402. For example, if the size of a given date is small, the calendar 400 may only display a summary or the first three words of a given event. In other embodiments, the calendar 400 may only display events indicated as important events. In still other embodiments, the calendar may not list any events for a given date, but indicate that events exist for a given date by displaying an image or icon, or using bold, underlined, or flashing text to display the date. In these embodiments, the calendar 400 may display information corresponding to the given events only after a user clicks on a given date.

In some embodiments, the calendar 400 may provide means to access a more detailed description or information corresponding to an event. In one embodiment, the calendar 400 may respond to a user clicking on an event by displaying a detailed description of the event. For example, while the text displayed in the month-view of 400 might be "Charlie's Birthday," clicking on the text of "Charlie's Birthday" might trigger a display of information relating to the time and place of Charlie's birthday party.

In some embodiments, the calendar 400 may provide means to input and change information corresponding to events. In some embodiments, a user may enter information about an event by selecting a day or time the event occurs, and then typing information corresponding to the event. In other embodiments, a user may enter information about an event by using an input display, such as the input display depicted in FIG. 9.

In some embodiments, the calendar 400 may highlight portions of the display corresponding to a given date, dates, event, or events. In one embodiment, a calendar 400 may highlight the current day. In another embodiment, the calendar 400 may highlight a date or dates selected by the user. In another embodiment, the calendar 400 may highlight dates corresponding to designated events. In still another embodiment, the calendar 400 may highlight specific events designated as important or special.

Figure 5:
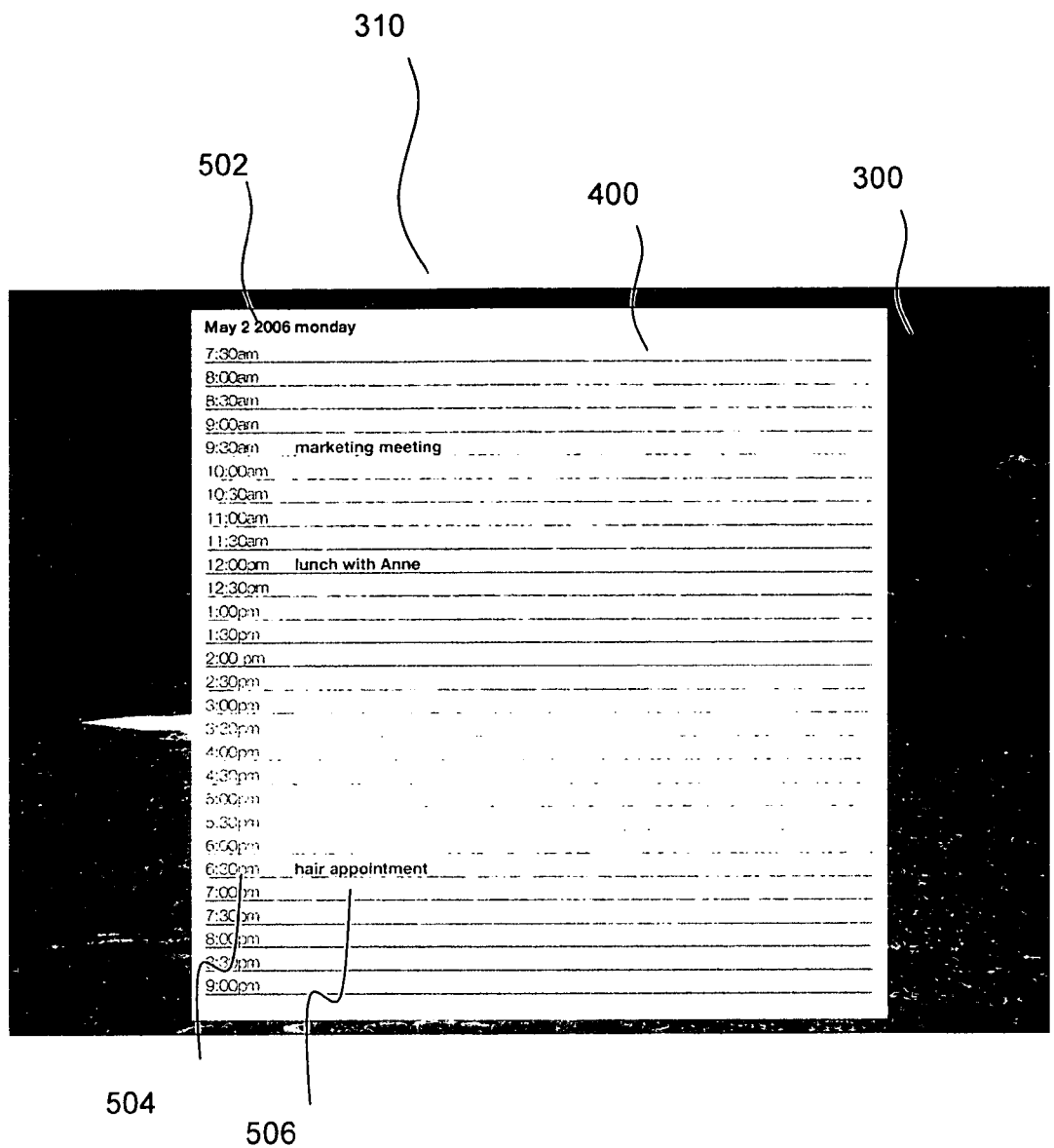
FIG. 5 is an illustration of another embodiment of a calendar displayed in a computer desktop application.

Referring now to FIG. 5, another embodiment of a calendar 400 displayed in a computer desktop application 300 is shown. The calendar 400 displays a list of time slots 504 and corresponding events 506 for a given date 502. In some embodiments, the calendar 400 may display only a portion of the time slots for a given date. In these embodiments, a user may access the time slots not displayed using a scrollbar, menu, button, or other input means.

Figure 6:
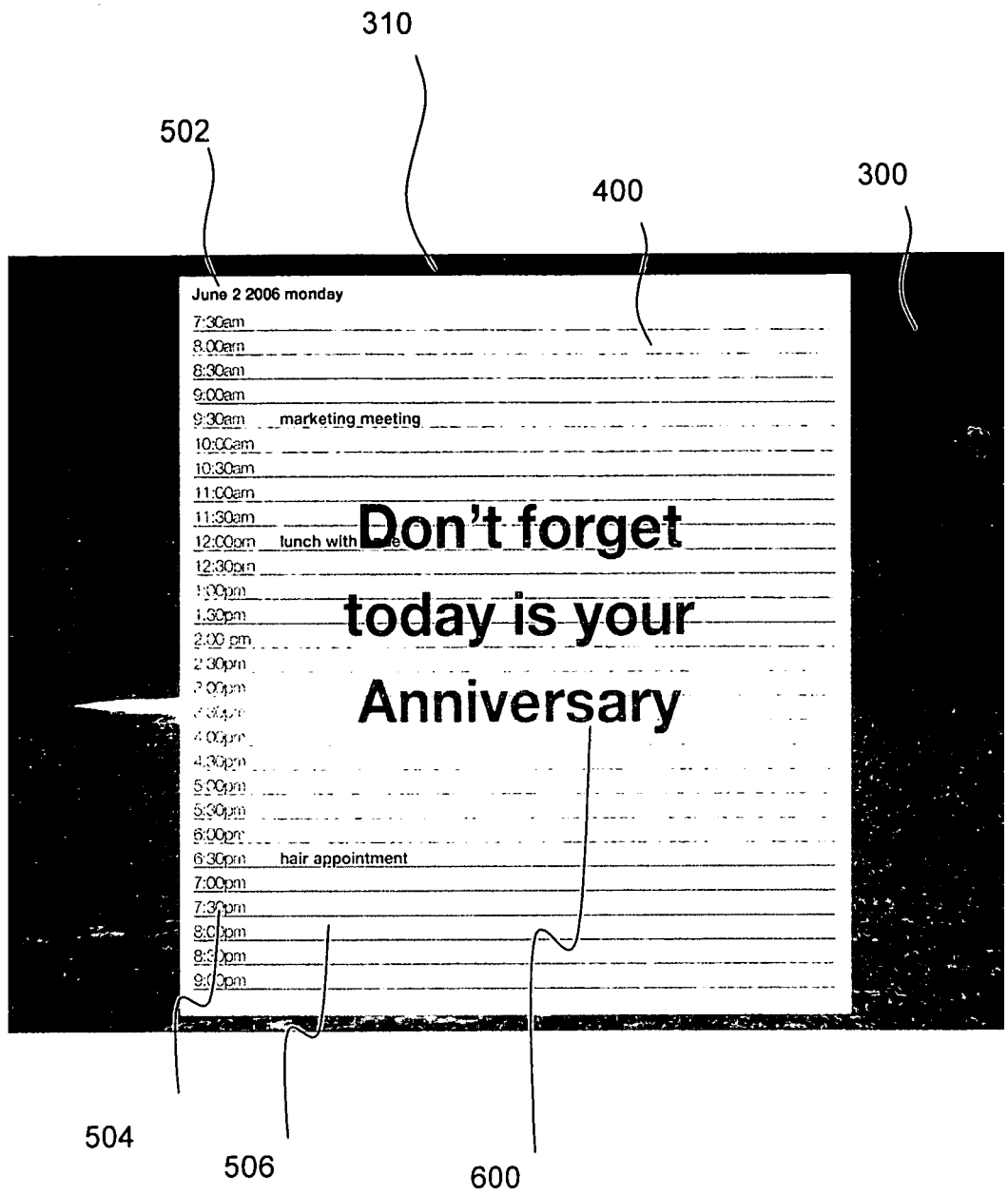
FIG. 6 is an illustration of an embodiment of displaying a calendar in a computer desktop application comprising a reminder.

Referring now to FIG. 6, another embodiment of a calendar 400 displayed in a computer desktop application 300 is shown. In brief overview, the calendar 400 displays a list of time slots 504 and corresponding events 506 for a given date 502. The calendar 400 also displays a reminder 600 corresponding to a given event.

Still referring to FIG. 6, now in greater detail, the calendar 400 displays a reminder 600 corresponding to a given event. A reminder 600 may comprise any information corresponding to a given event. In some embodiments, the reminder 600 may be displayed on the date of the event. In other embodiments, the reminder 600 may be displayed prior to the event. In still other embodiments, a reminder 600 may be displayed after an event. In some embodiments, a reminder 600 may be displayed much larger than other events or text on the calendar 400. In some embodiments a reminder 600 may be displayed in the same manner as events. In one embodiment, a reminder 600 may be displayed in a different portion of the desktop than the calendar 400. In other embodiments, the reminder 600 may be accompanied by a sound. In still other embodiments the reminder 600 may require user action to dismiss the reminder before the calendar 400 may be accessed. In other embodiments, the calendar 400 may provide functionality for delaying a viewed reminder. For example, a user might see a reminder 600 that his wife's birthday is one week away, click a button next to the reminder 600 marked "remind me tomorrow," and the calendar would display the reminder 600 again on the next day.

In some embodiments reminders may be provided automatically by the calendar 400, in other embodiments the reminders may be manually entered by a user. For example, a calendar 400 may automatically display a reminder one week before any person's birthday. Also as an example, a user may manually enter a reminder for three days before a business trip reminding to remind the user to reserve a hotel room.

Figure 7:
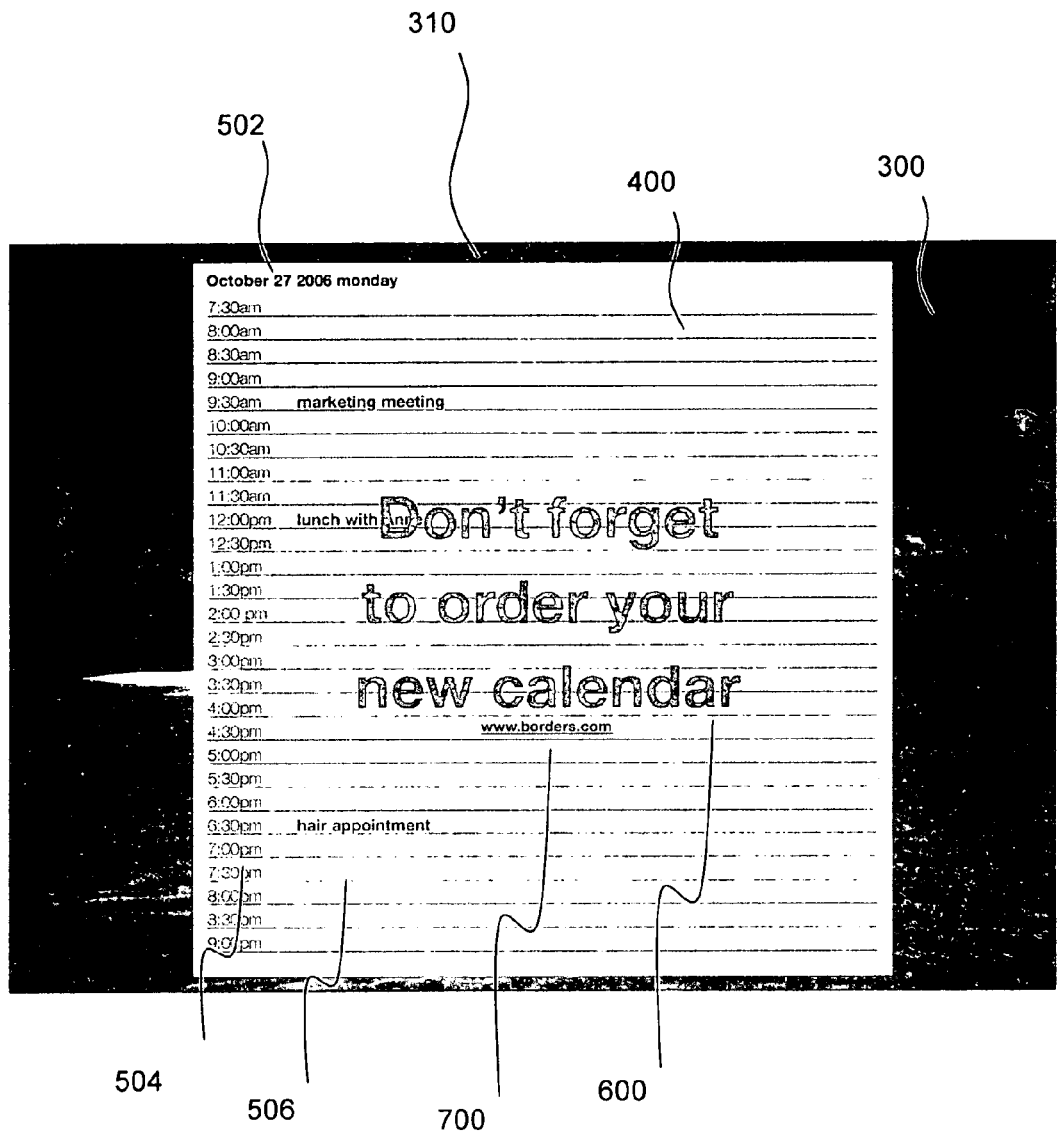
FIG. 7 is an illustration of an embodiment of displaying a calendar in a computer desktop application comprising a reminder, where said reminder comprises a link to an online store.

Referring now to FIG. 7, another embodiment of a calendar 400 displayed in a computer desktop application 300 is shown. In brief overview, the calendar 400 displays a list of time slots 504 and corresponding events 506 for a given date 502. The calendar 400 also displays a reminder 600 corresponding to a given event. The reminder 600 comprises information corresponding to a given event and a link to an online store 900.

Still referring to FIG. 7, now in greater detail, a calendar 600 displays a reminder 600 comprising information corresponding to a given event and a link to an online store 700. In one embodiment, in response to a user clicking on the link 700, the calendar 400 may open a new window comprising a web browser directed to the site. In another embodiment, in response to a user clicking on the link 700, the calendar 400 may open a web browser directed to the site within the calendar computer desktop application 300. In another embodiment, the user may copy the address referenced by the link 700 into an already open browser. In some embodiments, multiple links 700 may be displayed within a single reminder. For example, a reminder of a birthday might be comprise a link to both www.flowers.com and www.hallmark.com.

The link 700 comprises a link to an online store. An online store may comprise any web site where items may be obtained or purchased. Examples of links to online stores may include www.borders.com, www.amazon.com, www.starbucks.com, www.hallmark.com, and www.flowers.com. In some embodiments, the link 700 may comprise a link to a store's home page, such as www.borders.com. In other embodiments, the link 700 may comprise a link to a specific product within an online store. For example, the link 700 might comprise a link to a specific page offering a specific book for sale within www.borders.com. Or, for example, the link 700, might comprise a link to a specific type of flowers within www.flowers.com. In still another embodiment, a link 700 may comprise information that will allow the online store to identify the owner of the calendar. For example, a calendar 400 may access information identifying the owner of the calendar to a particular store, and append that information to the link 700. When the user clicked on the link, the online store may then identify the user and open a personalized page corresponding to the user.

In some embodiments, the online store may comprise a store offering e-Cards. Said e-Cards may comprise any form of electronic message. In some embodiments, an e-Card may comprise a message transmitted to a recipient via e-mail. In one embodiment, an e-Card may comprise an e-mail with a link to a website where the recipient may view a card. In some embodiments, the e-Cards may comprise personalized greetings. In other embodiments, the e-Cards may comprise any other images, sounds, or text. In some embodiments, said e-Cards may be sold, in other embodiments said e-Cards may be offered at no charge.

In some embodiments, the online store may comprise functionality for attaching a gift to an e-Card. In one embodiment, an online store might give a user the option of selecting from a plurality of e-Cards, and then give the user an option to specify a gift to be sent with said e-Card. For example, after a user selects a given e-Card, an online store may give the user an option to purchase a song from a downloadable music service to be included in said card. Or, for example, after a user selects a given e-Card, an online store may give the user an option to purchase a certificate redeemable at a store to be included in said card. In some embodiments, the online store may comprise links to third-party sites where a user may purchase gifts to be included with said e-Card. Gifts which may be included with an e-Card may comprise any gifts capable of being transmitted electronically, including without limitation music files, gift certificates redeemable online, gift certificates which may be printed by a recipient, software programs. In some embodiments, the online store may comprise links to third-party sites where a user may purchase items to be transmitted separately from said e-Card.

In other embodiments, additional text may be displayed along with the links 700. In some embodiments, the additional text might explain the items offered for sale at the online store. For example, the link www.hallmark.com might be accompanied by the text "Buy a card." In other embodiments, the additional text might comprise a special offer, sale, or other incentive for the user to visit the online store. For example, a link might be accompanied by the text "25% off your next purchase." In still other embodiments, the additional text might indicate a user's past action or actions with respect to similar events. For example, a link 700 might be accompanied by the text "you purchased tulips for this event last year," or the text "you bought coffee last month."

In still other embodiments, the reminder may comprise a coupon. The coupon may comprise a voucher, discount, sale, or other special offer from an online store or physical store. In one embodiment, the reminder may comprise a link to a printable coupon redeemable in person at a store. In another embodiment, the reminder may comprise a coupon redeemable at an online store. For example, the reminder may comprise the text "Go to www.hallmark.com and enter promotional code ABCDEFG," where ABCDEFG is a code entitling a user to $5 off a purchase price. In still another embodiment, a link 700 may comprise a coupon. For example, a link 700 may comprise a promotion code indicating to the online store that a user is entitled to a 10% discount. Or, for example, a link 700 may comprise a URL directed to a specific area of a site relating to a buy-one-get-one-free offer. Or for example, the coupon may comprise a voucher redeemable for a free song, card, coffee, or other item.

In some embodiments, the calendar 400 may comprise a link to an online store in a general display or in a general menu option. For example, a calendar may provide a link to an online store via a button in the bottom corner of the calendar display. Said button may comprise the text "click to send a card" and a link to an e-Card online store. For example, a user may learn of a sudden event, such as a friend becoming ill) for which the user desires to send a card, click on the link, and a web page corresponding to said online store will appear.

Figure 8:
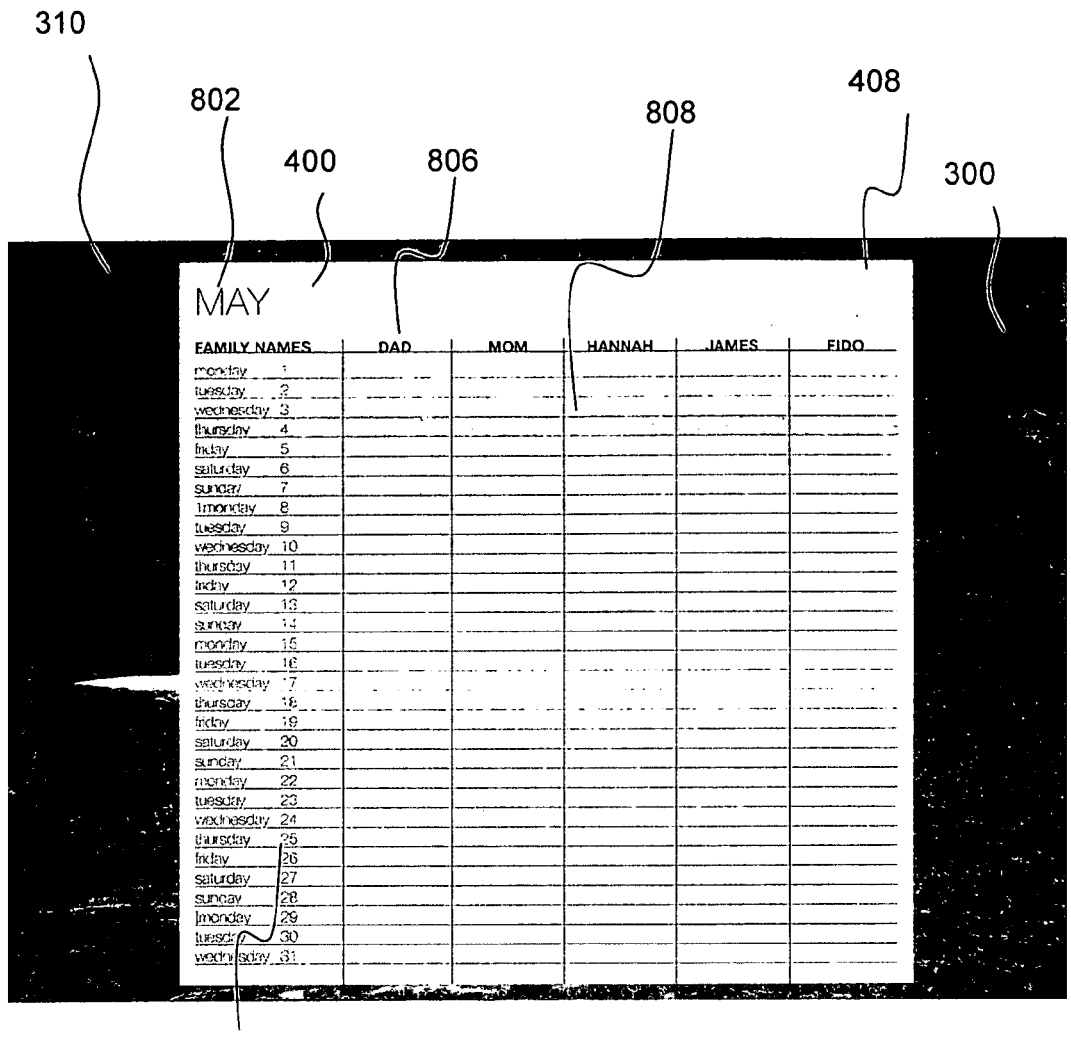
FIG. 8 is an illustration of another embodiment of a calendar displayed in a computer desktop application.

Referring now to FIG. 8, another embodiment of a calendar 400 displayed in a computer desktop application 300 is shown. The calendar 400 displays a list of days 804 for a given month 802. For each day 804 events are displayed corresponding to a plurality of given individuals 806. A date or dates may be highlighted 808.

Still referring to FIG. 8, now in greater detail, in the embodiment shown the calendar 400 displays event information across a number of individuals. The individuals may comprise any group of individuals, including family members, coworkers, friends, or contacts. In some embodiments, the event information corresponding to each person may be manually entered by the user of the calendar. For example, a father might enter information corresponding to a son's sporting event. In other embodiments, the event information corresponding to each person may be collected by the calendar 400 from a multitude of calendars used by the group of individuals. The multitude of calendars may comprise calendars of the same type as the calendar shown 400, or the multitude of calendars may comprise other electronic calendars. In some embodiments, events corresponding to individuals may be received from a server 205.

In some embodiments, the calendar 400 may display that two events corresponding to two individuals conflict. For example, the calendar 4000 may identify and highlight a time period if two individuals have events scheduled during that time. In other embodiments, the calendar 400 may also identify and display time periods in which all of the selected individuals are available.

Figure 9:
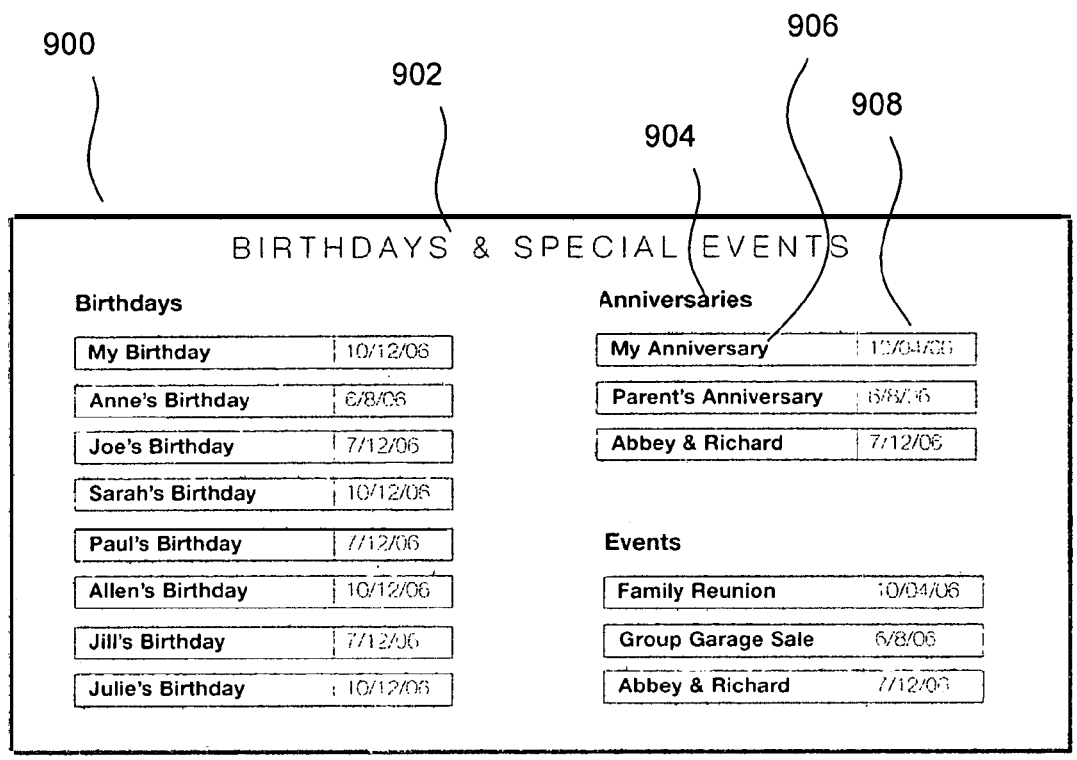
FIG. 9 is an illustration of an embodiment of input and output means for events corresponding to dates in a calendar.

Referring now to FIG. 9, an embodiment of an input display for entering events into a calendar 400 is shown. In brief overview, an input display 900 comprises means for entering information corresponding to a number of events 906 and dates 908 corresponding to the events 904. The events 904 on a given input display 900 may all be assigned to a given category 902 and may be grouped according to subcategories 902. An input display may also comprise means for entering information corresponding to actions to be taken with respect to events.

Still referring to FIG. 9, now in greater detail, an input display 900 accepts entry of events and dates into a calendar 400. The input display 900 may be displayed alongside a calendar 400 or displayed separately. In some embodiments, the input display 900 may be displayed in a desktop background 300; in other embodiments the input display 900 may be displayed in an application window. In some embodiments, the input display 900 may be opened by using any input device such as a menu, button, checkbox, or tab. In other embodiments, the input display 900 may be opened by clicking on a specific date or event.

In some embodiments, the input display 900 may comprise a general category 902. The general category 902 may comprise any category of events. Examples of general categories 902 may include birthdays, anniversaries, special events, holidays, meetings, phone calls, and appointments. In some embodiments the input display 900 may also comprise subcategories 904. In some embodiments, a category 902 or subcategory 904 may comprise events that share a certain renewal property. For example, a category may comprise yearly events, such as birthdays and anniversaries. In some embodiments the input screen may set a given renewal property for a given event. In other embodiments the input screen 900 may provide any input means, such as a menu, checkbox, or text field, for a user to input a renewal property for a given event.

The input display 900 comprises means for entering events 906. Events may be entered by any input means. In some embodiments, a user may type the name of an event in a text field. In other embodiments, a user may select an event title from a menu. The input screen 900 also comprises means for entering dates corresponding to the events. In some embodiments, a user may type the date of an event in a text field. In other embodiments, a user may select a date from a menu. In still other embodiments, event text or dates may be automatically filled in by the calendar 400.

The input display 900 may also comprise means for entering information corresponding to actions to be taken with respect to certain events. In one embodiment, an input display 900 may comprise fields which accept input of information corresponding to whether a user wishes to be reminded in advance of a given event. In other embodiments, an input display 900 may comprise fields which accept input of information corresponding to the automatic sending of an item for a given event. Said item may comprise any item corresponding to a given event, including a gift, e-mail, and e-Card. In one embodiment, the input display may comprise a checkbox next to an event labeled "send card on date." When a user checked the box, a second input screen may be displayed prompting the user for information about an e-Card to send, such as what type of card the user wished to send, and what message they wished to include. On the date of the event, the calendar 400 may then transmit instructions corresponding to the sending of said e-Card. In another embodiment, the input display may comprise a button corresponding to an event, said button labeled "send gift." When a user clicked the button, a second input screen may be displayed prompting the user for information about a gift to send, such as what type of gift, what online site to order the gift from, and purchase information such as a credit card number. On the date of the event, the calendar 400 may then transmit instructions corresponding to the ordering of said gift. In other embodiments, the calendar may transmit instructions corresponding to the ordering of said gift a given time period prior to said event.

In some embodiments, a calendar 400 may comprise additional displays for displaying as output a list of events entered. In some embodiments, these displays may be similar in appearance to the input display 900. Said output displays may list all events of a given type, or may list all events occurring within a given date range. In some embodiments, the output displays may display additional information corresponding to each event. In other embodiments, the output displays may comprise functionality for sorting events based on event properties.

Figure 10:
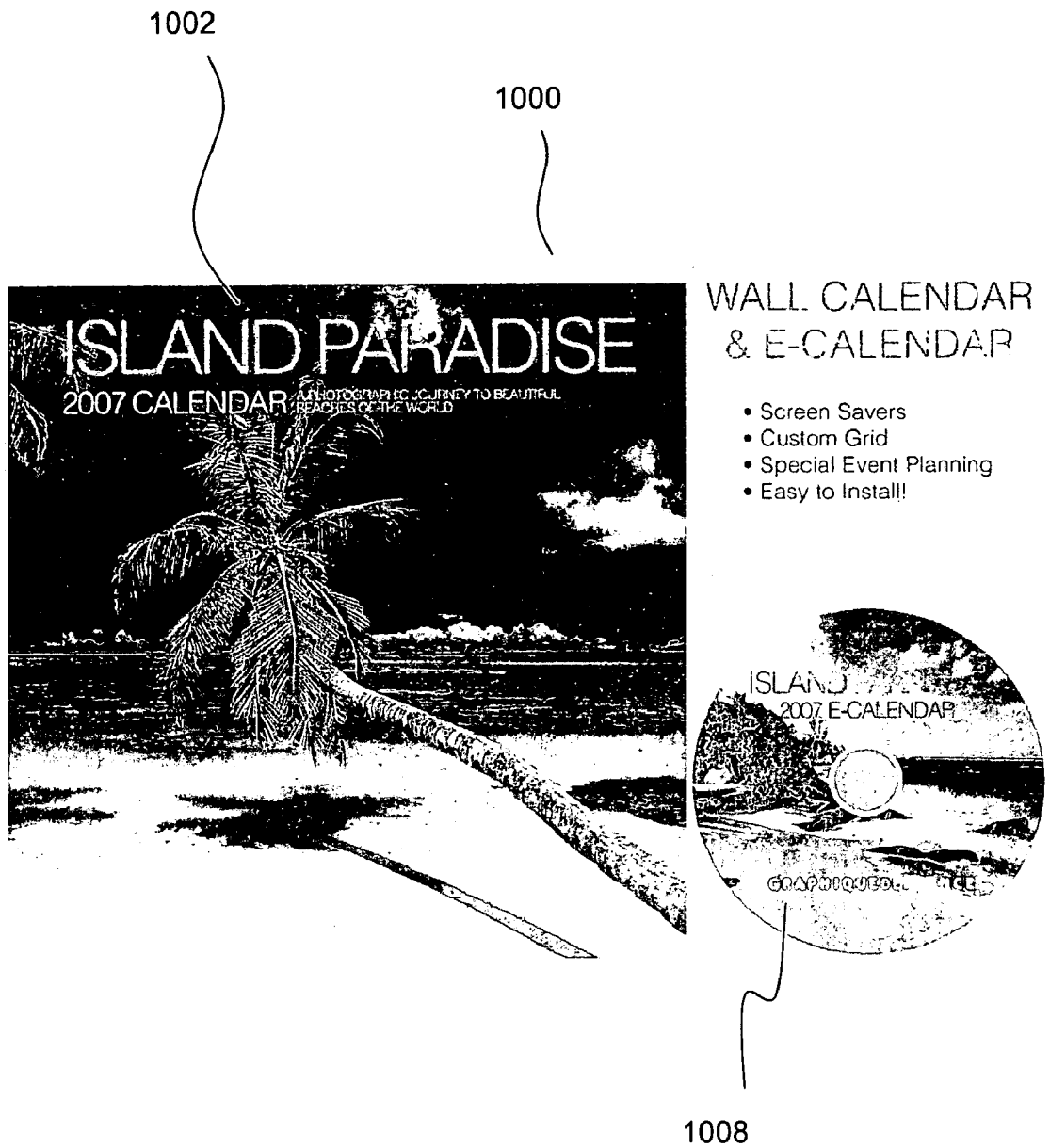
FIG. 10 is an illustration of an article of manufacture intended for sale as a unitary item comprising a printed calendar having a plurality of images, and computer readable program means for displaying a calendar in a computer desktop application

Referring now to FIG. 10, an embodiment of an article of manufacture 1000 intended for sale as a unitary item comprising a printed calendar 1002 having a plurality of images, and computer readable program means 1004 for displaying a calendar in a computer desktop application. In addition, the article 1002 may comprise any other elements, including packaging material, paper inserts, registration cards, coupons, other computer readable program means, and promotional material.

Still referring to FIG. 10, now in greater detail, an embodiment of an article of manufacture 1000 intended for sale as a unitary item is shown. The article 1000 may be packaged in any way such that the printed calendar 1002 and computer readable program means 1004 are sold together. In some embodiments, the calendar 1002 and computer readable program means 1004 may be packaged together in a box. In other embodiments, the calendar 1002 and computer readable program means 1004 may be shrink-wrapped together. In other embodiments, the computer readable programs means 1004 may be packaged as an insert within the printed calendar 1002. In still other embodiments, the printed calendar 1002 may be packaged with a specific link or code that allows that the purchaser of the calendar to download the computer readable program means 1004 from a web site.

The printed calendar 1002 may comprise any type of printed calendar comprising a plurality of images, including a wall calendar, desk calendar, planner, or journal. The plurality of images may comprise any series of images. In some embodiments, each of the plurality of images corresponds to a given theme. For example, a printed calendar 1002 may comprise images corresponding to a theme of tropical islands. Said plurality of images might include images of beaches, palm trees, and tropical wildlife. In some embodiments, each image in the plurality of images corresponds to a given month of the printed calendar 1002.

The computer readable program means 1004 may comprise any medium for distributing a computer readable program. In one embodiment, the computer readable program means 1004 may be provided on a Compact Disc or DVD. In another embodiment, the computer readable program means 1004 may be provided on a floppy disk. In still other embodiments the computer readable program means 1004 may comprise any other portable storage medium including a cartridge, ROM chip, or Flash drive. In another embodiment the computer readable program means 1004 may be downloaded by a purchaser by using a link or code printed in the article 1000.

In some embodiments, the article 1000 may also comprise computer readable program means for displaying a screensaver. In some embodiments, the screensaver may comprise an image or series of images. In one embodiment, the screensaver may comprise an image substantially similar to one of the plurality of images on the printed calendar 1002. In another embodiment, an image or images of the screensaver may correspond to a theme, said theme also corresponding to a plurality of images in the printed calendar 1002. In other embodiments the screensaver may comprise functionality for a user to insert images of the user's choice.

Figure 11:
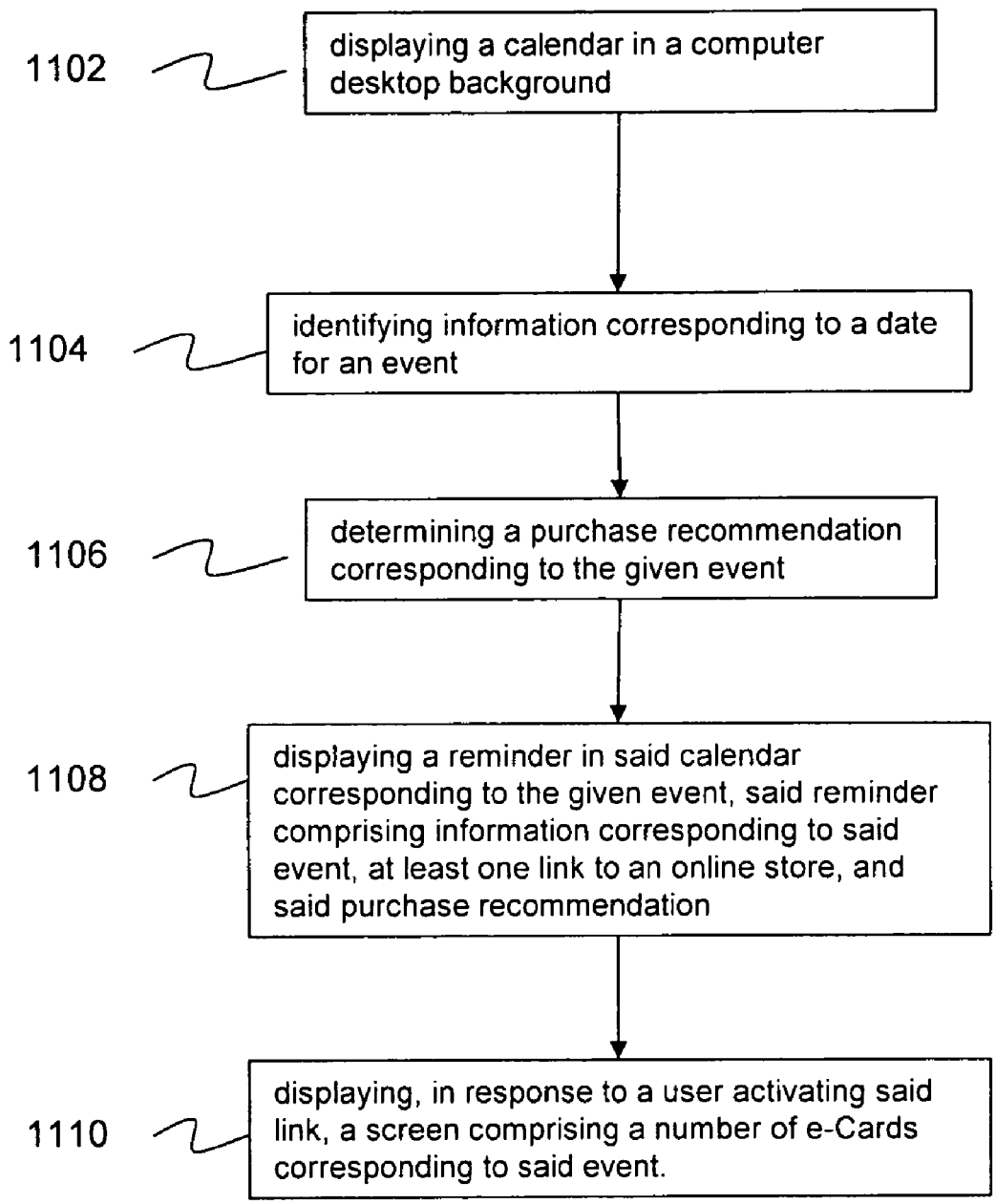
FIG. 11 is a flow diagram depicting one embodiment of a method for facilitating event purchases.

Referring now to FIG. 11, a flow diagram depicting one embodiment of a method for facilitating event purchases is shown. In brief overview, the method comprises displaying a calendar in a computer desktop application (step 1102); identifying information corresponding to a date for an event (step 1104); determining a purchase recommendation corresponding to the given event (1106); displaying a reminder in said calendar corresponding to the given event, said reminder comprising: information corresponding to said event, said purchase recommendation and at least one link to an online store (step 1108); and displaying, in response to a user activating said link, a screen comprising a number of e-Cards corresponding to said event (step 1110).

Still referring to FIG. 11, now in greater detail, the method comprises displaying a calendar 400 in a computer desktop application 300 (step 1102). The calendar 400 may comprise any of the features, embodiments, and techniques discussed herein. The calendar 400 may be displayed on any of the devices discussed herein. In some embodiments the calendar 400 may be displayed in response to a user action. In one embodiment, the calendar 400 may be displayed in response to a user altering the desktop settings of the user's computing device. In another embodiment, the calendar 400 may be displayed in response to a user running a given program. In another embodiment, the calendar 400 may be displayed after a certain period of user inactivity. In still another embodiment, the calendar 400 may be displayed in response to a certain area of the desktop being covered or uncovered. In other embodiments, the calendar 400 may automatically be displayed on startup.

After displaying a calendar 400 in a computer desktop application 300 (step 1102), a calendar 400 identifies information corresponding to a date for an event (step 1104). In some embodiments, a calendar 400 identifies information corresponding to a date for an event (step 1104) by reading information stored on a computing device. In one embodiment, a calendar 400 may read a table comprising a list of events and corresponding dates. In another embodiment, a calendar 400 may read a linked list of events and dates. In some embodiments, a calendar 400 may identify information manually entered by a user, such as, for example, in the input display depicted in FIG. 9.

In some embodiments, a calendar 400 may identify information corresponding to a date for an event (step 1104) by processing data from another application. In some embodiments the calendar 400 may import information from other calendar software residing on the computing device. Examples of calendar software from which the calendar 400 may import information include MICROSOFT OUTLOOK and MICROSOFT OUTLOOK EXPRESS, manufactured by the Microsoft Corporation and iCAL, manufactured by the Apple Corporation. In other embodiments, the calendar 400 may import information from a spreadsheet. Examples of spreadsheet software from which the calendar 400 may import information include MICROSOFT EXCEL and MICROSOFT WORKS manufactured by the Microsoft Corporation.

In some embodiments a calendar may identify information corresponding to a date for an event (step 1104) by adding or subtracting time from a given date. For example, a calendar 400 may identify a week before a person's birthday by consulting a table to determine the person's birthday, and then determining the date 7 days prior to the birthday.

After identifying information corresponding to a date for an event (step 1104), a calendar 400 may then determine a purchase recommendation corresponding to the given event (step 1106). A purchase recommendation may comprise a recommendation to purchase a product, products, brand of products, or class of products. A purchase recommendation may comprise a recommendation to purchase from a specific store, company, market, or geographic region. A purchase recommendation may comprise a recommendation to purchase a physical good, such as a book or coffee. A purchase recommendation may comprise a recommendation to purchase a non-physical good, such as music downloads, computer software, and e-Cards. A purchase recommendation may comprise a recommendation to purchase something at a particular price, or purchase something at a particular time. A purchase recommendation may comprise a recommendation for a method of purchase. In some embodiments, a purchase recommendation may comprise a recommendation to purchase from an online store. In other embodiments, a purchase recommendation may comprise a recommendation to use a given coupon or promotional code when purchasing. In some embodiments the calendar 400 may determine a plurality of purchase recommendations corresponding to an event.

In some embodiments, the calendar 400 may determine a purchase recommendation with respect to the type of the given event. In one embodiment, a calendar 400 may determine a purchase recommendation based on a given holiday. For example, the calendar 400 may determine a purchase recommendation comprising red roses for Valentine's Day. Or, for example, the calendar 400 may determine a purchase recommendation comprising a toy store for Christmas. In other embodiments, a calendar 400 may determine a purchase recommendation based on a type of event such as a birthday or anniversary. For example, a calendar 400 may determine a purchase recommendation comprising chocolate cake for a birthday, or a calendar may determine a purchase recommendation comprising a romantic card for an anniversary.

In some embodiments, the calendar 400 may determine a type of an event through a user specifying that an event is a predetermined type. For example, a user might check a box next to an event indicating that the event is a birthday. Or, for example, the user might enter information corresponding to the event in an input display like the input display 900 previously discussed which contains categories for types of events. In other embodiments, the calendar 400 may process information corresponding to the event to determine a type for the event. For example, a calendar 400 might determine that the user-entered event "Steve's party" corresponds to a party, and subsequently determine a purchase recommendation of a bottle of wine. In still other embodiments, the calendar 400 may process other information to determine a type for the event. For example, a calendar 400 might determine that the user entered event "Steve's party" is a Christmas party, based on the information that "Steve's party" is on December $22^{nd}$. Or, for example, a calendar might determine that the user entered event "Dinner with Sarah" is a birthday event, based on information that Sarah's birthday is two days after the dinner.

In some embodiments, a calendar 400 may determine a purchase recommendation with respect to a record of a given printed calendar being purchased. The record of a given printed calendar being purchased may comprise the date, time, place, and type of calendar purchased. In some embodiments, the record of a given printed calendar being purchased comprises a record of a given printed calendar 1002 being purchased together with the calendar 400 in a single article of manufacture such as the article depicted previously in FIG. 10. In one embodiment, the calendar may generate a record of the printed calendar 1002 purchased with the calendar 400 by prompting a user to enter information corresponding to the purchase. In another embodiment a record of the purchase may be stored on computer readable program means 1004 comprising the type of the bundled printed calendar 1002 and the store selling the printed calendar 1002.

In some embodiments, a calendar 400 may determine a date when a given printed calendar will expire based on a record of the printed calendar being purchased. The calendar 400 may then determine a purchase recommendation for a new printed calendar on the given date. For example, a calendar 400 may determine a purchase recommendation of a 2007 calendar featuring poodles based on a record that a user purchased a 2006 calendar comprising images of dogs.

In some embodiments, a calendar 400 may determine a purchase recommendation with respect to an image or images in a printed calendar. For example, a calendar 400 may determine a purchase recommendation of a dog treat for Christmas based on the printed calendar comprising images of dogs. In another embodiment, a calendar 400 may determine a purchase recommendation with respect to a theme corresponding to images in a printed calendar. For example, a calendar 400 may determine a purchase recommendation of hotel reservations in Colorado based on the printed calendar having a theme of mountains. In still another embodiment, a calendar 400 may determine a purchase recommendation with respect to a likely demographic corresponding to a record of a given printed calendar purchase. For example, a calendar 400 may determine a purchase recommendation of football tickets based on a record of a purchase of a printed calendar comprising images of sports cars.

In one embodiment, the calendar 400 may determine a purchase recommendation with respect to past user activity with respect to a given event. In some embodiments, the calendar 400 may determine a purchase recommendation with respect to a past purchase made for a recurring event. For example, the calendar 400 may determine a purchase recommendation of red roses for Valentine's Day with respect to information that a user purchased red roses on the previous Valentine's Day. Or, for example, the calendar 400 may determine a purchase recommendation of a novel for a birthday with respect to information that the user purchased a book for the previous birthday. Or, for example, a calendar might determine a purchase recommendation of chocolate for Valentine's Day with respect to information that a user declined to purchase flowers on the previous Valentine's Day.

In some embodiments, a calendar 400 may determine a purchase recommendation with respect to a number of past activities. For example, a calendar might determine a purchase recommendation of flowers for the event "Sarah's party" with respect to information that a user declined to purchase wine for a previous "Sarah's party", but purchased flowers for a previous event titled "Susan's party."

In some embodiments, a calendar 400 may determine a purchase recommendation with respect to a record of a given screensaver being used. In some embodiments, the given screensaver comprises a screensaver purchased with the calendar 400 in a single article of manufacture 1000. For example, a calendar 400 may determine a purchase recommendation of a dog treat for Christmas based on a screensaver comprising images of dogs. In another embodiment, a calendar 400 may determine a purchase recommendation with respect to a theme corresponding to images in a screensaver. For example, a calendar 400 may determine a purchase recommendation of hotel reservations in Colorado based on the screensaver having a theme of mountains. In still another embodiment, a calendar 400 may determine a purchase recommendation with respect to a likely demographic corresponding to a record of a given screensaver being used. For example, a calendar 400 may determine a purchase recommendation of football tickets based on a record of a purchase of a screensaver comprising images of sports cars.

After determining a purchase recommendation corresponding to the given event (step 1106), the calendar 400 may display a reminder 600 in said calendar 400 corresponding to the given event, said reminder 600 comprising information corresponding to said event, at least one link to an online store 700, and said purchase recommendation (step 1108). The reminder 600 and link to an online store 700 may be displayed according to any of the methods previously discussed. In some embodiments said link to an online store comprises a link to an online store offering an item for sale recommended by said purchase recommendation.

The purchase recommendation may be displayed in any font, color, style or manner. In some embodiments, the purchase recommendation may comprise text, in other embodiments the purchase recommendation may comprise an image, movie, or sound corresponding to the recommendation. In some embodiments, the purchase recommendation may be displayed in the same style and manner as events. In other embodiments, the purchase recommendation may be displayed in a different style, font, or location than events.

In some embodiments, the calendar 400 may display the purchase recommendation separately from the link to an online store 700. In one embodiment, the purchase recommendation may be displayed as text prior to or following the link to an online store 700. For example, the link www.borders.com may be followed by text displaying a purchase recommendation "buy a romantic novel." Or, for example, the purchase recommendation displayed as "buy red roses" might be followed by links to a plurality of online florists.

In some embodiments, the purchase recommendation may be integrated into the link to an online store 700. In some embodiments, a link to an online store 700 may be modified to take a user directly to the page where a recommended item can be purchased. In other embodiments, a link to an online store 700 may be modified to include a coupon or promotional code corresponding to the purchase recommendation.

After displaying a reminder in said calendar corresponding to the given event, said reminder comprising: information corresponding to said event, said purchase recommendation and at least one link to an online store (step 1108); the calendar 400 may display, in response to a user activating said link, a screen comprising a number of e-Cards corresponding to said event (step 1110). In some embodiments, displaying a screen comprising a number of e-Cards (step 1110) may comprise launching a web browser directed to a given web site offering a number of e-Cards corresponding to said event. In one embodiment, the browser may be launched within the calendar 400 application window. In another embodiment, the browser may be launched in a new window. The web site comprising a number of e-Cards may comprise any website comprising e-Cards discussed herein.

Figure 12:
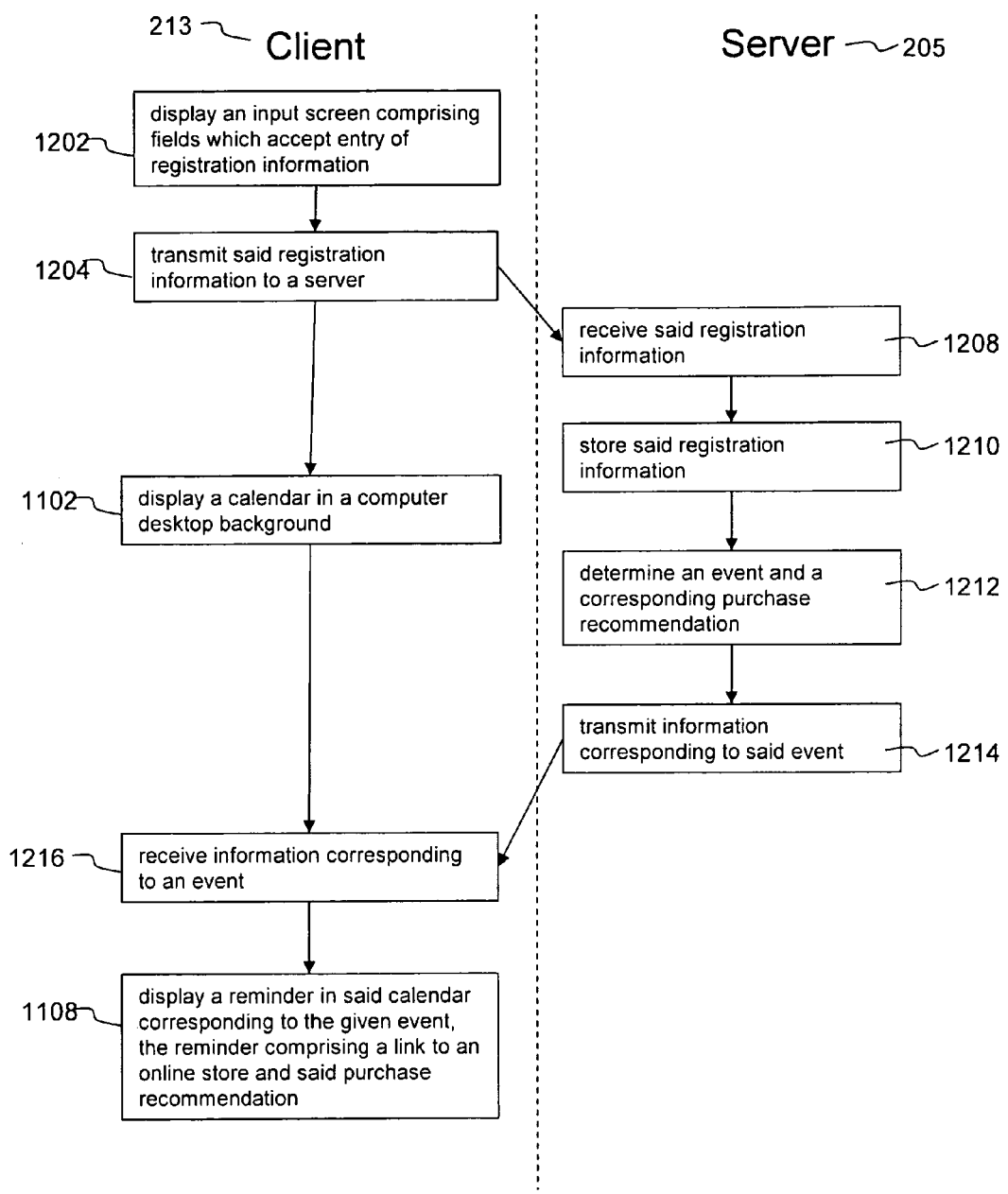
FIG. 12 is a flow diagram of another embodiment of a method for facilitating event purchases.

Referring now to FIG. 12, a flow diagram of another embodiment of a method for facilitating event purchases is shown. In brief overview, a client 213 displays an input screen comprising fields which accept entry of registration information (step 1202); transmits said registration information to a server (step 1204); and displays a calendar in a computer desktop application (step 1102). A server 205 receives said registration information (step 1208); stores said registration information (step 1210); determines, with respect to said registration information, an event and a purchase recommendation corresponding to said event (step 1212); and transmits information corresponding to said event and purchase recommendation (step 1214). A client 213 receives information from the server corresponding to said event (step 1216); and displays a reminder in the calendar corresponding to the given event, said reminder comprising information corresponding to said event, said purchase recommendation and at least one link to an online store (step 1108).

Still referring to FIG. 12, now in greater detail, a client 213 displays an input screen comprising fields which accept entry of registration information (step 1202). In some embodiments, the input screen may comprise part of a calendar 400 executing in a computer desktop application. In some embodiments, the input screen may be displayed prior to the installation of a calendar 400. In other embodiments, the input screen may be displayed after the installation of a calendar 400. In some embodiments, a user may have an option to complete the input screen. In other embodiments, a user may be forced to complete the input screen in order to install a calendar 400.

The registration information may comprise any information corresponding to a user, a product, a purchase, or a user's computer. In some embodiments, the registration information may comprise personal information such as a name, birthday, address, and gender. In other embodiments, the registration information may comprise information corresponding to the date and location of a purchase of a printed calendar. The printed calendar may comprise a calendar 1002 sold together with calendar software 1008. In some embodiments, some or all of the input fields may be automatically completed.

After a client 213 displays an input screen comprising fields which accept entry of registration information (step 1202), the client 213 transmits said registration information to a server (step 1204). Said transmission may occur over any of the protocols, networks, and communication means previously discussed. In some embodiments, a client 213 may transmit other any other information along with the registration information. For example, a client 213 may determine the system configuration of the user and transmit that information along with the registration information.

In the embodiment shown, after the client 213 transmits said registration information to a server (step 1204) the client 213 displays a calendar 400 in a computer desktop application (step 1102). Although FIG. 12 depicts the calendar 400 being displayed after the registration process, in some embodiments, the calendar 400 may be displayed at any time before, during or after the input of registration information (step 1202). In other embodiments, the calendar 400 may be displayed at any time before, during, or after the transmission of said registration information.

In the embodiment shown, a server 205 receives the registration information (Step 1208). The server may receive the information via any of the protocols, networks, and communication means previously discussed. In some embodiments, a central server 205 may be configured to receive registration information from a plurality or a totality of calendars 400. In other embodiments, a plurality of servers running at a plurality of locations may receive registration information from a plurality or a totality of calendars 400.

After the server 205 receives the registration information (step 1208), the server 205 stores the registration information (step 1210). In some embodiments, the registration information may be stored on the server 205; in other embodiments, the registration information may be stored on an external computing device. In some embodiments the registration information may be stored along with other data corresponding to a given user or calendar. In other embodiments, the registration information may be transferred to a third party.

After the server 205 stores the registration information (step 1208), the server 205 determines, with respect to said registration information, an event and a purchase recommendation corresponding to said event (step 1210). The server may determine an event using any of the methods previously described. In one embodiment, the server may determine an event corresponding to a user's birthday. In another embodiment, the server may determine an event corresponding to the expiration of a printed calendar 1002.

The server 205 may determine a purchase recommendation using any of the previously discussed methods for determining a purchase recommendation. In some embodiments, the server may determine a purchase recommendation using only the registration information received. In other embodiments, the server may determine a purchase recommendation with respect to a plurality of received registration information. In some embodiments a server may determine a plurality of purchase recommendations. In still other embodiments, the server may determine a purchase recommendation with respect to a combination of received registration information and other information. In some embodiments, the other information may comprise publicly available knowledge, databases of customer data, data provided by third parties, and data relating to past calendar activity.

In some embodiments, the registration information and purchase recommendation may be transmitted to an online store. Said online store may comprise any online store as discussed herein. In one embodiment, said online store may be configured to recognize requests for links 700 originating in a calendar 400. Said online store may display web page corresponding to a given calendar 400 user upon receiving a request for a link 700 originating in a calendar 400. In one embodiment, said online store may comprise e-Cards which may be transmitted to a given recipient. In another embodiment, said online store may display said purchase recommendation and enable a user to attach the recommended purchase to an e-Card. For example, the online store may recommend the purchase of a music download, and, should the user purchase said music download, attach said music download to the e-Card when the e-Card is transmitted to the recipient. In one embodiment, said online store may provide a link to a third-party site in conjunction with said purchase recommendation. In some embodiments, the server or servers receiving the registration information may also operate an online store as discussed herein. In some embodiments, an online store may operate said server or servers in the collection and processing of any user information.

After the server 205 determines an event and a purchase recommendation corresponding to the event (step 1210), the server 205 transmits information corresponding to said event and purchase recommendation (step 1212). The server 205 may transmit said information over any of the protocols, networks, and communication means previously discussed. In some embodiments, the server may transmit information corresponding to a given event and purchase recommendation to a single client 213. In other embodiments the server may transmit the same information to a plurality of clients 213. In other embodiments, a server 205 may transmit information corresponding to a plurality of events and purchase recommendations to a single client 213.

In the embodiment shown, a client then receives information corresponding to an event (step 1216). The client may receive the information via any of the protocols, networks, and communication means previously discussed. In some embodiments a client 213 may receive information corresponding to a plurality of events. In other embodiments a client may receive information corresponding to an event and a purchase recommendation for said event. In still other embodiments a client may receive information corresponding to a plurality of events and purchase recommendations.

After receiving information corresponding to an event (step 1216) the client 213 the client 213 may display a reminder 600 in said calendar 400 corresponding to the given event, said reminder 600 comprising information corresponding to said event, at least one link to an online store 700, and said purchase recommendation (step 1108). This step may be carried out using any of the methods previously discussed. In some embodiments, the calendar 400 may display information corresponding to events received from a server in a different manner than the calendar 400 displays information corresponding to events entered by a user. In other embodiments, the calendar 400 may display information corresponding to events received from a server in a manner similar to the manner the calendar 400 displays information corresponding to events entered by a user.

Figure 13:
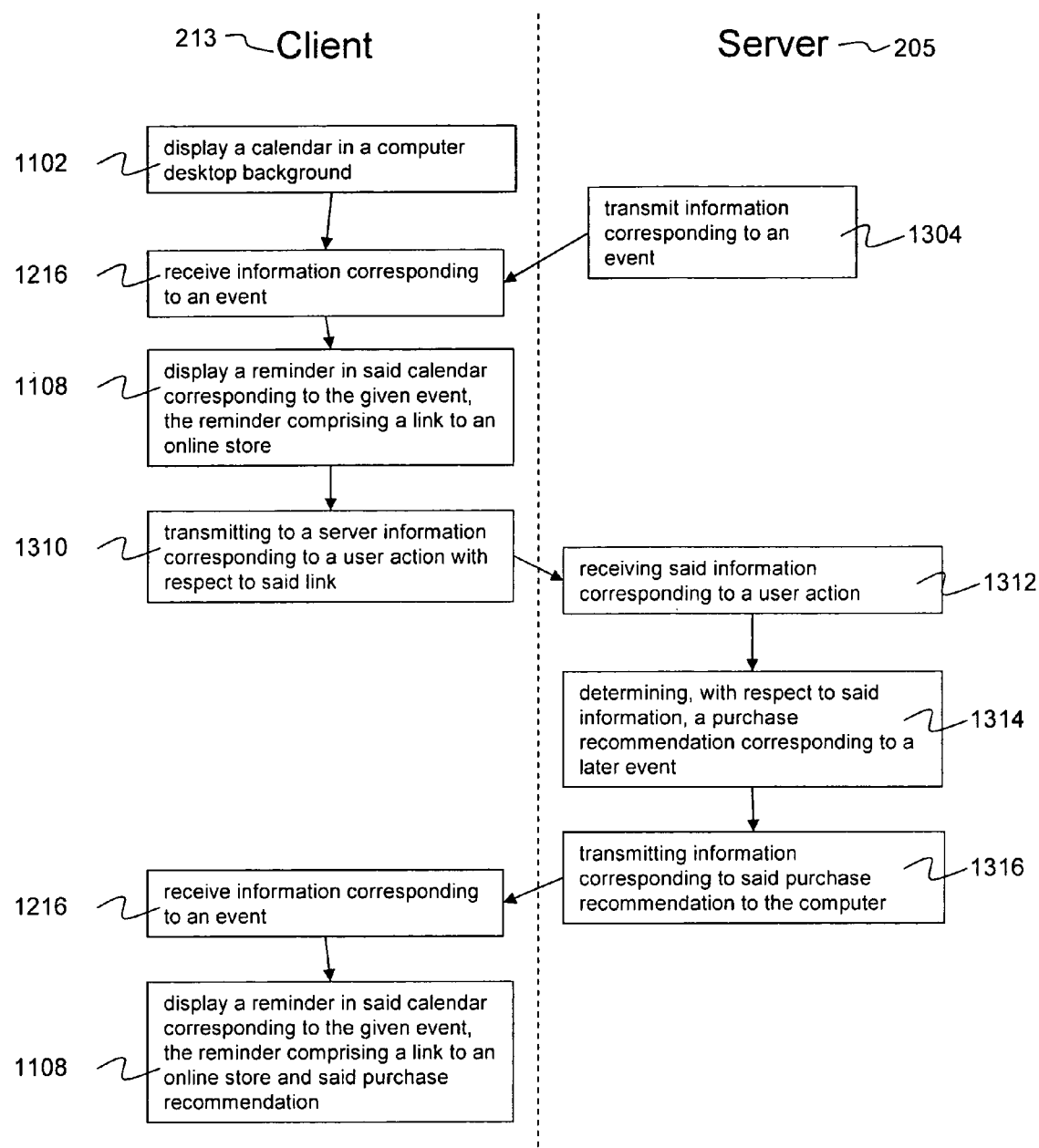
FIG. 13 is a flow diagram of another embodiment of a method for facilitating event purchases.

Referring now to FIG. 13, a flow diagram of another embodiment of a method for facilitating event purchases is shown. In brief overview, a client 213 displays a calendar in a computer desktop application (step 1102); receives information from a server corresponding to an event (step 1216); displays a reminder in the calendar corresponding to the given event, said reminder comprising information corresponding to said event, and at least one link to an online store (step 1108); and transmits to a server information corresponding to a user action with respect to said link (step 1310). A server 205 receives said information corresponding to a user action (step 1312); determines, with respect to said information, a purchase recommendation corresponding to a later event (step 1314); and transmits information corresponding to said purchase recommendation. A client 213 receives information from the server corresponding to the event (step 1216); and displays a reminder in the calendar corresponding to the given event, said reminder comprising information corresponding to said event, and at least one link to an online store (step 1108).

Still referring to FIG. 13, now in greater detail, a client 213 displays a calendar in a computer desktop application (step 1102). This step may be performed in accordance with any of the methods previously discussed.

The client 213 receives information from a server corresponding to an event (step 1216). This step may be performed in accordance with any of the methods previously discussed.

The client displays a reminder in the calendar corresponding to the given event, said reminder comprising information corresponding to said event, and at least one link to an online store (step 1108). This step may be performed in accordance with any of the methods previously discussed.

The client 213 then transmits to a server information corresponding to a user action with respect to said link (step 1310). The client may transmit the information over any of the protocols, networks, and communication means previously discussed. In some embodiments the information transmitted may comprise information about whether the user clicked on the link. In some embodiments, the information transmitted may comprise a date that the user clicked on the link. In other embodiments, the information may comprise information indicating whether the user viewed the page referenced by the link. In one embodiment, the information may comprise a time interval the user spent viewing the page or site referenced by the link. In another embodiment, the information may comprise information about whether the user purchased an item from the page or site referenced by the link. In still another embodiment, the information may comprise information about whether a user followed a given purchase recommendation with respect to the link.

The client 213 may transmit any other information along with the information corresponding to a user action. In some embodiments, the client 213 may also transmit information corresponding to past, current, or future events. In other embodiments, the client 213 may transmit information corresponding to any other user activity with respect to the calendar, such as the frequency of use, times and dates of use, number of entries, and type of entries. In still other embodiments, the client may transmit information corresponding to any other user activity, including the user's type of computer, software installed, frequency of computer use, or frequency of web browsing.

The server 205 receives the information corresponding to a user action (step 1312). The server 205 may receive the information over any of the protocols, networks, and communication means previously discussed. In some embodiments, the server may receive the information in combination with other information corresponding to the client 213, or a calendar 400 executing on the client 213. In some embodiments, the server 205 may receive information corresponding to a plurality of user actions corresponding to a plurality of users.

The server 205 then determines with respect to said information, a purchase recommendation corresponding to a later event (step 1314). The server 205 may determine the purchase recommendation according to any of the methods previously discussed. In some embodiments a server 205 may determine a plurality of purchase recommendations. In some embodiments, the server 205 may determine a purchase recommendation using only the information received. In other embodiments, the server 205 may determine a purchase recommendation with respect to a plurality of received registration information and information corresponding to user actions. In still other embodiments, the server 205 may determine a purchase recommendation with respect to a combination of information corresponding to a user action and any other information. In some embodiments, the other information may comprise publicly available knowledge, databases of customer data, data provided by third parties, and data relating to past calendar activity.

The later event may comprise any event occurring during or after the time the server receives the information. In some embodiments, the later event may be determined by the server 205. In some embodiments, the later event may correspond to an event entered by a user. In some embodiments, the later event may correspond to an event similar to an event corresponding to the information received corresponding to a user action. In some embodiments, the later event may correspond to an event for the user from which the user action information was received. In other embodiments, the later event may correspond to an event for a different user.

The server 205 then transmits information corresponding to said purchase recommendation to a client 213 (step 1316). The server 205 may transmit said information over any of the protocols, networks, and communication means previously discussed. In some embodiments the server will transmit the information to the same client 213 from which the server received information corresponding to the user action. In other embodiments, the server 205 may transmit the information corresponding to the purchase recommendation to a different client. In some embodiments, the server may transmit information corresponding to a given event and purchase recommendation to a single client 213. In other embodiments the server may transmit the same information to a plurality of clients 213. In other embodiments, a server 205 may transmit information corresponding to a plurality of events and purchase recommendations to a single client 213.

The client 213 may then receive information corresponding to said event (step 1216). This step may be performed in accordance with any of the methods previously discussed.

The client 213 may then display a reminder 600 in said calendar 400 corresponding to the given event, said reminder 600 comprising information corresponding to said event, at least one link to an online store 700, and said purchase recommendation (step 1108). This step may be performed in accordance with any of the methods previously discussed.

Referring now to FIG. 14, a flow diagram of another embodiment of a method for facilitating event purchases is shown. In brief overview, the method comprises displaying a calendar in a computer desktop application (step 1102); and transmitting, to a server, information corresponding to an event entered by a user (step 502).

Still referring to FIG. 14, now in greater detail, the method comprises displaying a calendar 400 in a computer desktop application (step 1102). This step may be performed in accordance with any of the methods previously discussed.

The calendar 400 may then transmit, to a server, information corresponding to an event entered by a user (step 1402). The event may have been entered by the user by any of the means previously discussed. The calendar 400 may transmit the information over any of the protocols, networks, and communication means previously described. In some embodiment, the calendar 400 may transmit the information in combination with any of the information and transmissions previously discussed. In some embodiments, the calendar 400 may also transmit information corresponding to past, current, or future events. In other embodiments, the calendar 400 may transmit information corresponding to any other user activity with respect to the calendar, such as the frequency of use, times and dates of use, number of entries, and type of entries. In still other embodiments, the calendar 400 may transmit information corresponding to any other user activity, including the user's type of computer, software installed, frequency of computer use, or frequency of web browsing.

While various embodiments of the present invention have been described above, it should be understood that they have been presented by way of example only, and not limitation. Thus, it will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

I claim:

1. A method for facilitating event purchases, said method comprising the steps of:
   displaying a calendar in a computer desktop application;
   identifying information corresponding to a date for an event;
   displaying a reminder in said calendar corresponding to the given event, said reminder comprising information corresponding to said event and at least one link to an online store; and
   determining a purchase recommendation corresponding to the given event, wherein the purchase recommendation is determined with respect to a record of a given screensaver being used.

2. The method of claim 1 wherein said purchase recommendation is determined with respect to a type of said event.

3. The method of claim 1 wherein said purchase recommendation is determined with respect to a record of a given printed calendar being purchased.

4. The method of claim 1 wherein said purchase recommendation is determined with respect to past user activity with respect to the given event.

5. The method of claim 1, said reminder further comprising the purchase recommendation.

6. The method of claim 5 wherein said link to an online store comprises a link to an online store offering an item for sale recommended by said purchase recommendation.

7. The method of claim 1 wherein said event corresponds to the expiration of a printed calendar.

8. The method of claim 7 wherein said reminder comprises information corresponding to the expiration of said printed calendar and at least one link to an online store offering calendars for sale.

9. The method of claim 1, said reminder further comprising at least one coupon.

10. The method of claim 1 further comprising the step of:
    displaying an input screen comprising fields which accept input of information corresponding to events and information corresponding to actions to be taken with respect to said events.

11. The method of claim 10 wherein said fields accept input of information corresponding to automatic transmission of an item upon occurrence of an event.

12. The method of claim 11 further comprising the step of automatically transmitting said item upon occurrence of said event.

13. The method of claim 1, further comprising the step of:
    displaying, in response to a user activating said link, a screen comprising a number of e-Cards corresponding to said event.

14. The method of claim 13, wherein the e-Cards are displayed in a web page.

15. The method of claim 14, wherein said web page comprises means for including a gift with said e-Card.

16. The method of claim 15, wherein said gift comprises a certificate redeemable at a store.

17. A computer-implemented system for facilitating event purchases, said system comprising:
    a screen which displays a calendar in a computer desktop application, said calendar comprising a reminder corresponding to a given event, said reminder comprising:
        information corresponding to said event, and
        at least one link to an online store;
    a processor in communication with the screen which identifies information corresponding to a date for an event, generates said reminders, and determines a purchase recommendation corresponding to the given event, wherein the purchase recommendation is determined with respect to a given screensaver being used; and
    a storage element in communication with said processor and said screen which stores information relating to said calendar.

18. The system of claim 17 wherein said purchase recommendation is determined with respect to a type of said event.

19. The system of claim 17 wherein said purchase recommendation is determined with respect to a record of a given printed calendar being purchased.

20. The system of claim 17 wherein said purchase recommendation is determined with respect to past user activity with respect to the given event.

21. The system of claim 17 wherein said reminder further comprises the purchase recommendation.

22. The system of claim 21 wherein said link to an online store comprises a link to an online store offering an item for sale recommended by said purchase recommendation.

23. The system of claim 17 wherein said event corresponds to the expiration of a printed calendar.

24. The system of claim 23 wherein said reminder comprises information corresponding to the expiration of said printed calendar and at least one link to an online store offering calendars for sale.

25. The system of claim 17, wherein said reminder further comprises at least one coupon.

26. The system of claim 17 further comprising an input screen comprising fields which accept input of information corresponding to events and information corresponding to actions to be taken with respect to said events.

27. The system of claim 26 wherein said fields accept input of information corresponding to automatic transmission of an item upon occurrence of an event.

28. The system of claim 27 further comprising a transmitter which transmits information corresponding to the sending of said item upon occurrence of said event.

29. The system of claim 17, further comprising:
    a web browser which, in response to a user activating said link, displays a web page comprising a number of e-Cards corresponding to said event.

30. The system of claim 29, wherein said web page comprises means for including a gift with said e-Card.

31. The system of claim 30, wherein said gift comprises a certificate redeemable at a store.

* * * * *

UNITED STATES PATENT AND TRADEMARK OFFICE
CERTIFICATE OF CORRECTION

PATENT NO. : 7,979,319 B2 Page 1 of 1
APPLICATION NO. : 11/384027
DATED : July 12, 2011
INVENTOR(S) : Jean-Jacques Toulotte It is certified that error appears in the above-identified patent and that said Letters Patent is hereby corrected as shown below:

On the title page item (75),

Replace "Ipwich"
With "Ipswich"

Signed and Sealed this
Thirtieth Day of August, 2011

David J. Kappos
*Director of the United States Patent and Trademark Office*